(12) United States Patent
Ogura

(10) Patent No.: US 7,255,394 B2
(45) Date of Patent: Aug. 14, 2007

(54) LUMBAR SUPPORT, CUSHION FOR SEAT, AND SEAT STRUCTURE

(75) Inventor: Yumi Ogura, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 11/311,190

(22) Filed: Dec. 19, 2005

(65) Prior Publication Data

US 2006/0138832 A1   Jun. 29, 2006

(30) Foreign Application Priority Data

Dec. 28, 2004 (JP) ............................. 2004-381735
May 30, 2005 (JP) ............................. 2005-156824

(51) Int. Cl.
*A47C 7/46* (2006.01)

(52) U.S. Cl. ............................... 297/284.4; 297/284.3; 297/284.5

(58) Field of Classification Search ............. 297/284.3, 297/284.4, 284.5
See application file for complete search history.

(56) References Cited

U.S. PATENT DOCUMENTS

| | | | | |
|---|---|---|---|---|
| 3,326,601 A | * | 6/1967 | Vanderbilt et al. | 297/284.6 |
| 4,718,724 A | * | 1/1988 | Quinton et al. | 297/284.5 |
| 4,761,011 A | * | 8/1988 | Sereboff | 297/452.41 |
| 5,076,643 A | | 12/1991 | Colasanti et al. | |
| 5,137,329 A | * | 8/1992 | Neale | 297/284.6 |
| 5,562,324 A | * | 10/1996 | Massara et al. | 297/284.6 |
| 5,772,281 A | * | 6/1998 | Massara | 297/284.4 |
| 5,868,466 A | | 2/1999 | Massara et al. | |
| 5,902,011 A | | 5/1999 | Hand et al. | |
| 2003/0230917 A1 | | 12/2003 | Dorfler et al. | |
| 2004/0095006 A1 | | 5/2004 | Chen | |
| 2005/0231014 A1 | * | 10/2005 | Carlisle | 297/284.7 |

FOREIGN PATENT DOCUMENTS

| | | |
|---|---|---|
| DE | 39 04 090 A1 | 8/1990 |
| DE | 296 00 759 U1 | 4/1996 |

* cited by examiner

*Primary Examiner*—Peter R. Brown
(74) *Attorney, Agent, or Firm*—Wolf Block Schorr & Solis-Cohen LLP

(57) ABSTRACT

In order to provide a lumbar support which conforms to the curve of the spinal column so as not to give a feeling of incompatibility or other unpleasant feeling, and is easily adjusted to meet a user's preference, a lumbar support 10 of the present invention is structured such that a bulging member 30 provided with two housing parts 31 and 32 to house a cushioning material for adjustment 34 is fixed on the back surface of a flexible plate 20, which is incorporated so that the front surface of the flexible plate 20 is positioned to the front surface side of a back cushion 120. Accordingly, the curvature of the two housing parts 31 and 32 does not affect a feeling of contact with the waist as it is, but works as a feeling of contact with larger curvature owing to the flexible plate 20, which results in suppression of pressure on the nervous system between the third and fourth lumbar vertebrae. Furthermore, by setting the width of a border region 33 between the two housing parts 31 and 32 in an appropriate range, it is possible to suppress a feeling of pressure on such a nervous system, and at the same time, to suppress any feeling of incompatibility or other unpleasant feeling caused by too large a curvature.

19 Claims, 21 Drawing Sheets

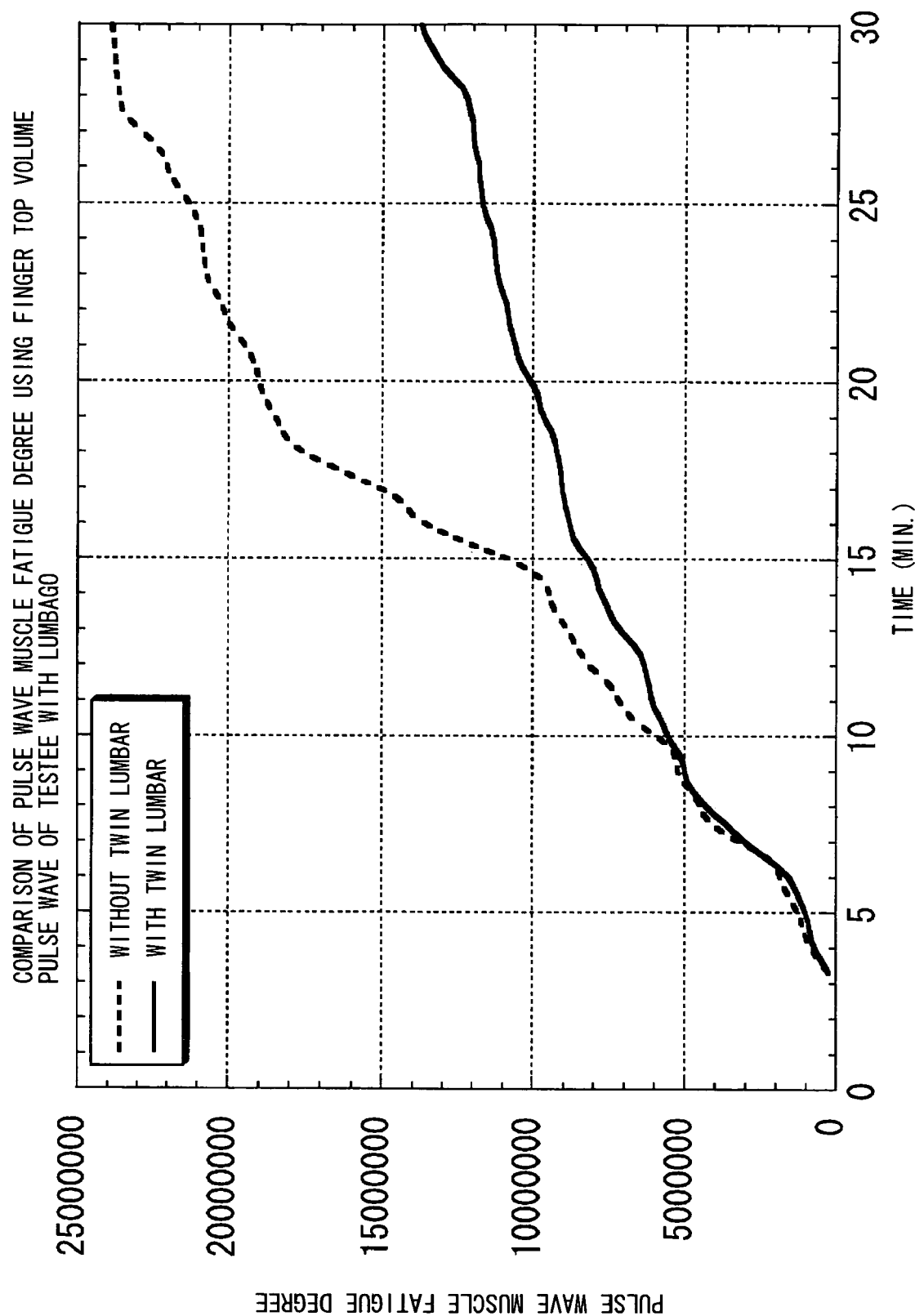

F I G. 1 1
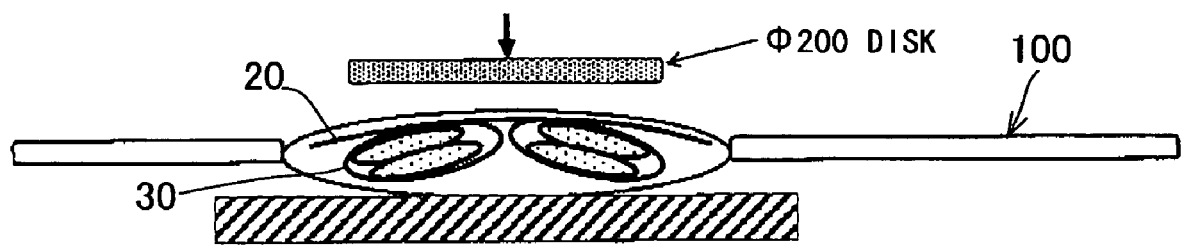

F I G. 1 2
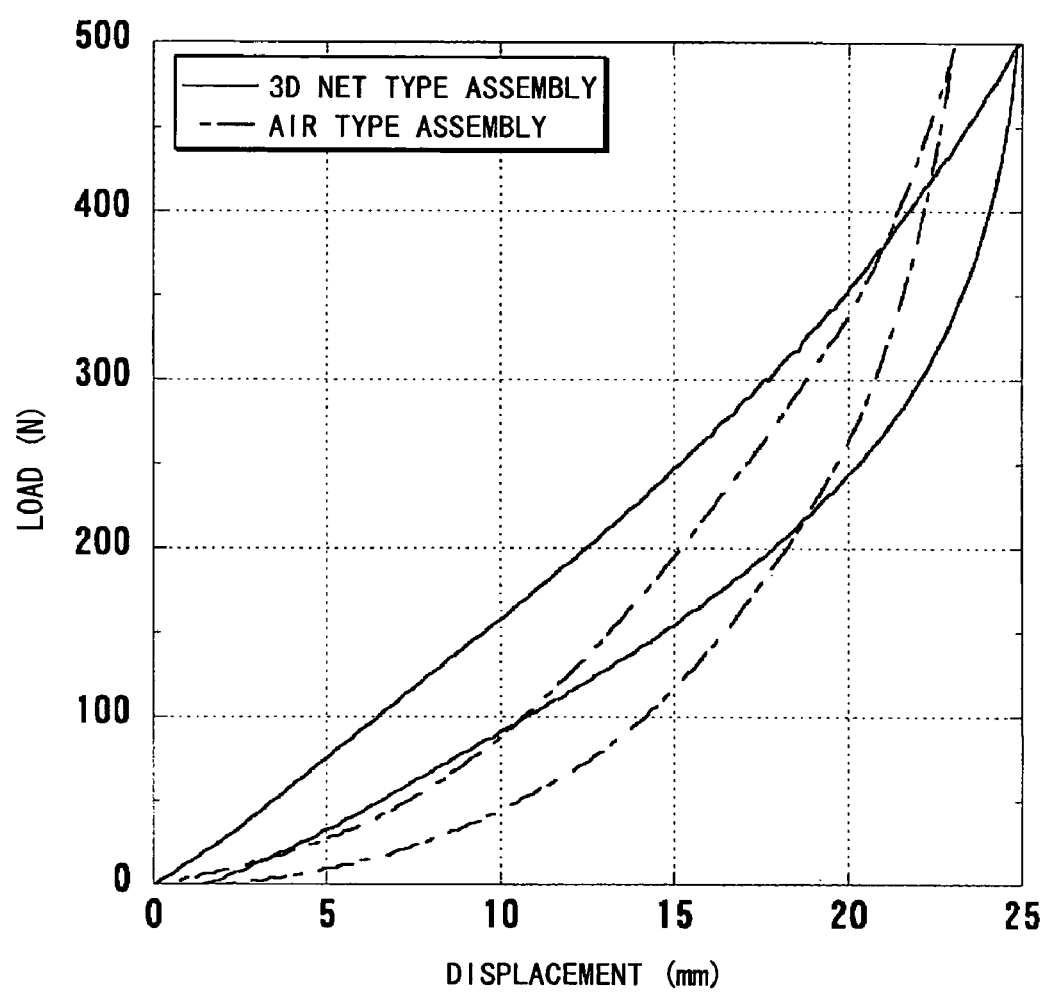
TEST SPEED : 50mm/min
PRESSURE BOARD : φ200mm
MEASUREMENT DATE : 04/12/20

F I G. 1 7 A
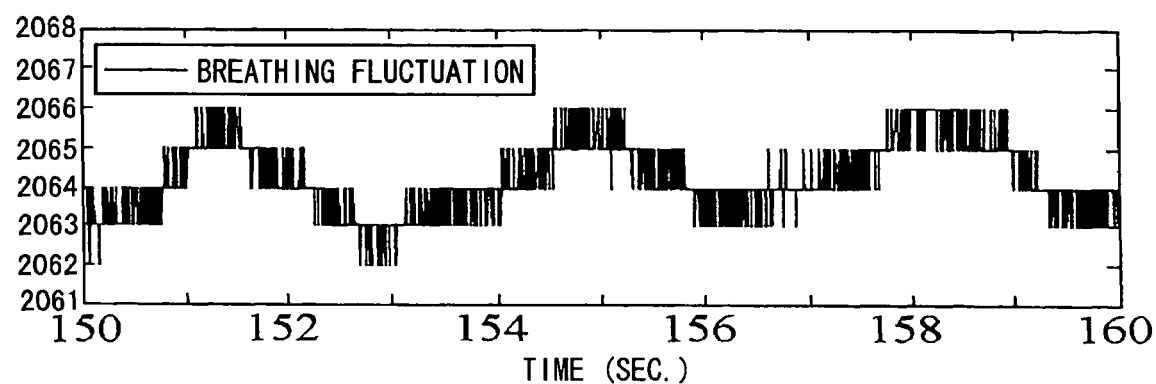
F I G. 1 7 B
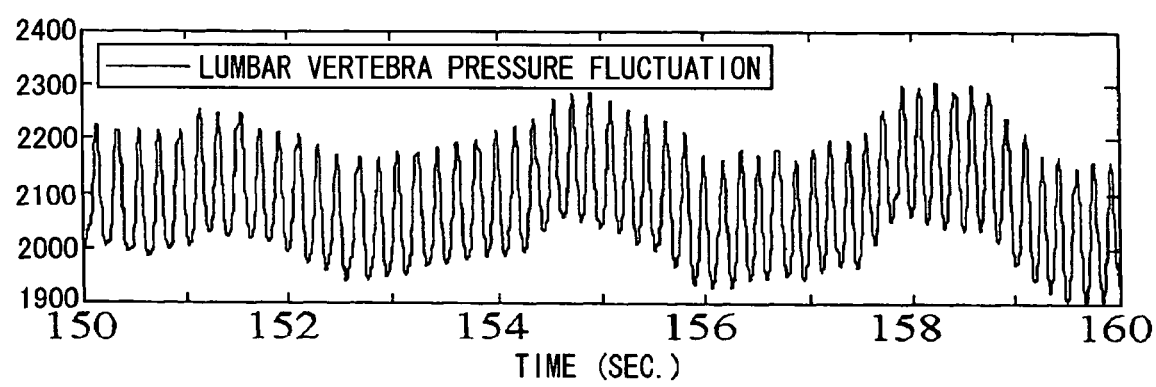

F I G. 1 8 A
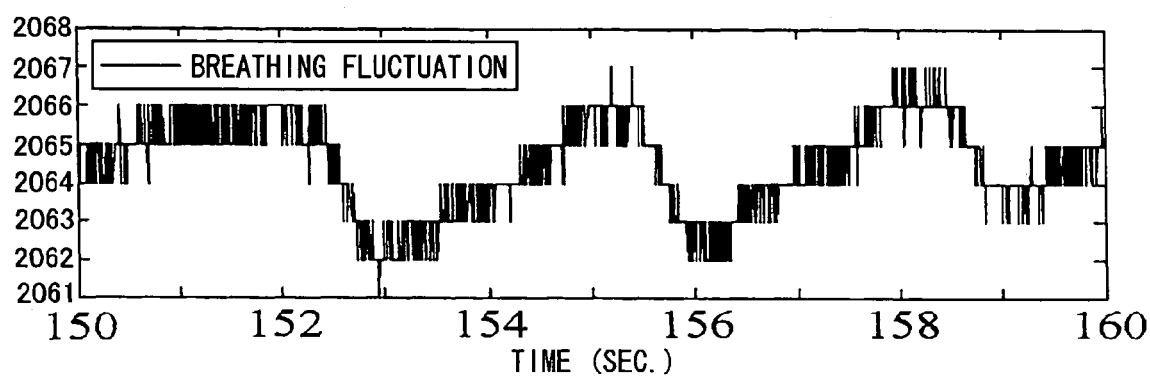
F I G. 1 8 B
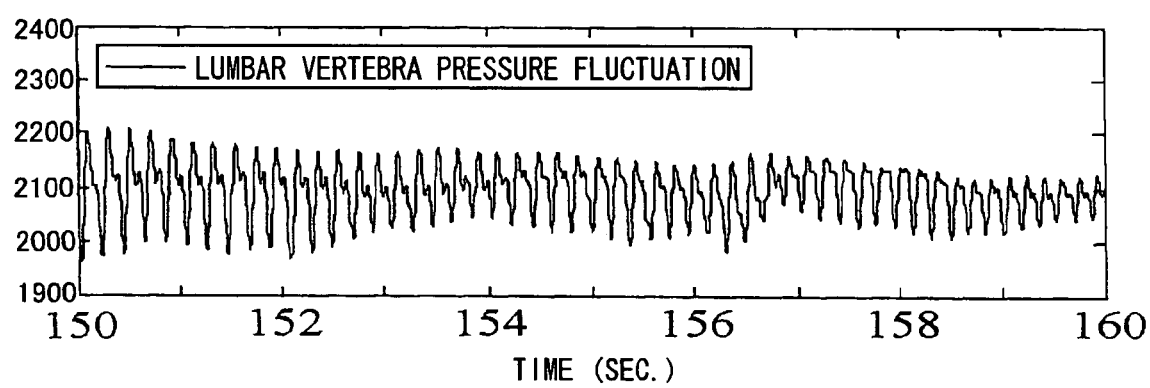

LUMBAR SUPPORT, CUSHION FOR SEAT, AND SEAT STRUCTURE

BACKGROUND OF THE INVENTION

1. Field of the Invention

The present invention relates to a lumbar support suitably used for a cushion for a seat, which is used by being mounted in a seat structure for transportation machines such as an automobile, a plane, a train, a ship, a fork lift and the like, those seat cushion and a seat back, a cushion for a seat, into which the lumbar support is incorporated, and a seat structure into which the lumbar support is incorporated.

2. Description of the Related Art

In Patent Document 1, a back mat which is made by attaching a bag as an air cushion on a flat rubber mat base is disclosed. The back mat is used by fixing on a seat back of an office chair, a car seat, and the like with a belt member. It is also disclosed that the air cushion is provided at a position corresponding to the vicinity of a seated person's waist, and formation of an air cushion in a plurality of rooms to ensure air permeability. In Patent Document 2, disclosed is a lumbago protection seat cover formed in an integral structure provided with a bottom cushion and a back cushion, attached with an air cushion at a position corresponding to the vicinity of the waist in the back cushion, without description of a base material. In Patent Document 3, disclosed is a seat cover provided with a lumbar support which can adjust a position of a pad loaded in a belt body folded into two by adjusting the position to fix the belt body.

[Patent Document 1] Japanese Utility Model Registration No. 3057132

[Patent Document 2] Japanese Utility Model Application No. Hei 6-82969

[Patent Document 3] Japanese Patent Application Laid-open No. 2002-325651

The air cushions disclosed in Patent Documents 1 and 2 use a soft flexible material as a bag to be filled with air, a pump is connected to this bag via a connection tube and air is loaded therein. However, no matter how airtight the bag and the connection tube, air still leaks gradually during use. Therefore, the desired elasticity of the air cushion is difficult to obtain depending on the air leaked amount, and the cushion's function as a sufficient lumbar support to support the waist disappears at an early stage, resulting in an increase in the number of times the cushion needs to be refilled by pump. Especially, on a driver's seat in a car, if the air cushion comes short of elasticity due to air leakage, it is extremely difficult to adjust the pump during driving. It is possible to adjust a feeling of support to the waist to suit individual preferences with the technology described in Patent Document 3, but this only goes as far as changing the height of the pad by adjusting a position to fix the belt body using a Hook-and-Loop fastener. In other words, since it is only a structure to be able to adjust the height of a lumbar support, it is impossible to adjust a feeling of cushioning unlike an air cushion type lumbar support disclosed in the Patent Document 1, and the like.

All of the Patent Documents 1 to 3 disclose a lumbar support having a plurality of bulging portions. This is mainly for ensuring air permeability by gaps between the bulging portions. However, if curvature of the bulging portion is too small or too large, a feeling of a strong pressure contact or a sense of a lack of conformity is felt when coming into contact with the back (the waist). That is, a lumbar support is provided to support in the vicinity of the third to fourth human lumbar vertebrae, and the average distance between the third and fourth lumbar vertebrae of Japanese adults is about 40 mm. When the curvature of a touched surface is too small, a nervous system between the third lumbar vertebra and the fourth lumbar vertebra is pressed, and when it is too large, a sense of lack of conformity or an unpleasant feeling is felt because it is not parallel to a curve of the spinal column.

SUMMARY OF THE INVENTION

The present invention has been made in view of the above problems and an object of the present invention is to provide a lumbar support which has two bulges (housing part), avoids exerting pressure on the nervous system between the third lumbar vertebra and the fourth lumbar vertebra, and is parallel to a curve of the back so that no feeling of a lack of conformity or no unpleasant is felt, and a cushion for a seat and a seat structure into which the lumbar support is incorporated. In addition, an object of the present invention is to provide a lumbar support which can easily adjust a cushioning feeling fitting to user's preference even when it is not an air cushion type, and a cushion for a seat and a seat structure incorporating such a lumbar support. Furthermore, when it is an air cushion type to fill air as a cushioning material for adjustment, an object of the present invention is to provide a lumbar support having a desired elasticity even if air leakage occurs and can exhibit a function as a lumbar support for a long time, and a cushion for a seat and a seat structure incorporating such a lumbar support.

In order to solve the above problems, the present invention described in claim 1 is a lumbar support incorporated into a back cushion, including:

a flexible plate made of plastic; and a bulging member provided with two housing parts formed adjacent to each other in the vertical direction of the back cushion, sandwiching a border region and able to house and take out a cushioning material for adjustment in each inside thereof, in which the bulging member is supported by bonding the border region on the back surface of the flexible plate, and is incorporated into the back cushion so that the front surface of the flexible plate is positioned on the front surface side of the back cushion.

The present invention described in claim 2 provides the lumbar support according to claim 1, in which a supporting cloth material is annexed to the back surface of the back cushion, and the lumbar support is disposed between the back cushion and the supporting cloth material.

The present invention described in claim 3 provides the lumbar support according to claim 1, in which the flexible plate and the bulging member are provided such that when the bulging member is placed in contact with a flat measurement surface, roughly a flat surface having a width of 40 mm to 60 mm is formed in the direction parallel to the vertical direction when incorporated into the back cushion and in an area including the border region.

The present invention described in claim 4 provides the lumbar support according to claim 1, in which the width of the border region of the bulging member is in the range of 12 mm to 25 mm.

The present invention described in claim 5 provides the lumbar support according to claim 1, in which the sizes of two housing parts composing the bulging member differ from each other, and the positional relation of the two housing parts in the vertical direction at the time of disposition is adjustable.

The present invention described in claim 6 provides the lumbar support according to claim 1, in which the number of cushioning materials for adjustment, which can be inserted into or taken out from each housing part is adjustable.

The present invention described in claim 7 provides the lumbar support according to claim 1, in which the flexible plate and the bulging member are connected along a line through approximately the center of the border region parallel to the length of the border region.

The present invention described in claim 8 provides the lumbar support according to claim 7, in which the flexible plate and the bulging member are sewn together.

The present invention described in claim 9 provides the lumbar support according to claim 1, in which the bulging member is made of a solid knitted fabric, and is formed by welding overlapped border region of respective solid knitted fabrics.

The present invention described in claim 10 provides the lumbar support according to claim 1, in which the cushioning material for adjustment is made of a solid knitted fabric.

The present invention described in claim 11 provides the lumbar support according to claim 10, in which the periphery of the solid knitted fabric is edge-treated by welding.

The present invention described in claim 12 provides the lumbar support according to claim 1, in which the cushioning material for adjustment comprises:

an air bag main body including a connection tube serving as an opening for air-flow, connected to a pump for filling air, and holding air filled inside via the connection tube to form an air room; and a solid knitted fabric disposed in the air bag main body.

The present invention described in claim 13 provides the lumbar support according to claim 12, in which the cushioning material for adjustment is used such that a pump is connected to a connection tube.

The present invention described in claim 14 provides the lumbar support according to claim 1, in which the flexible plate is provided with a characteristic of a spring constant in the range of 0.3 N/mm to 0.6 N/mm obtained from a load-to-deflection characteristic when supported at intervals of 150 mm, and pressed while adjusting the center of a press board having a diameter of 98 mm to the center thereof.

The present invention described in claim 15 provides the lumbar support according to claim 1, in which the flexible plate has an area larger than the projected area of the bulging member provided with two housing parts.

The present invention described in claim 16 provides a cushion for a seat, integrally formed of a bottom cushion and a back cushion, and used by being mounted on a seat cushion and a seat back of a seat structure, in which the bottom cushion and back cushion are formed from a solid knitted fabric, and a lumbar support is incorporated into the back cushion, in which the lumber support includes a flexible plate made of plastic; and a bulging member provided with two housing parts formed adjacent to each other in the vertical direction of the back cushion, sandwiching a border region and able to house and take out a cushioning material for adjustment in each inside thereof, in which the bulging member is supported by bonding the border region on the back surface of the flexible plate, and is incorporated into the back cushion so that the front surface of the flexible plate is positioned on the front surface side of the back cushion.

The present invention described in claim 17 provides a seat structure provided with a seat cushion and a seat back, in which a lumbar support is incorporated into a back cushion disposed on the seat back, in which the lumber support includes a flexible plate made of plastic; and a bulging member provided with two housing parts formed adjacent to each other in the vertical direction of the back cushion, sandwiching a border region and able to house and take out a cushioning material for adjustment in each inside thereof, in which the bulging member is supported by bonding the border region on the back surface of the flexible plate, and is incorporated into the back cushion so that the front surface of the flexible plate is positioned on the front surface side of the back cushion.

The present invention described in claim 18 provides a cushion for a seat integrally formed of a bottom cushion and a back cushion, and used by being mounted on a seat cushion and a seat back in a seat structure, in which the bottom cushion and back cushion are formed from a solid knitted fabric, and an auxiliary cushioning member is incorporated into the bottom cushion in which the lumber support includes a flexible plate made of plastic; and a bulging member provided with two housing parts formed adjacent to each other in the vertical direction of the back cushion, sandwiching a border region and able to house and take out a cushioning material for adjustment in each inside thereof, in which the bulging member is supported by bonding the border region on the back surface of the flexible plate, and is incorporated into the back cushion so that the front surface of the flexible plate is positioned on the front surface side of the back cushion.

The present invention described in claim 19 provides a seat structure provided with a seat cushion and a seat back, in which an auxiliary cushioning member is incorporated into a bottom cushion disposed on the seat cushion, in which the auxiliary cushioning member includes a flexible plate made of plastic; and a bulging member provided with two housing parts formed adjacent to each other in the vertical direction of the back cushion, sandwiching a border region and able to house and take out a cushioning material for adjustment in each inside thereof, in which the bulging member is supported by bonding the border region on the back surface of the flexible plate, and is incorporated into the back cushion so that the front surface of the flexible plate is positioned on the front surface side of the back cushion.

The lumbar support of the present invention is structured such that a bulging member provided with two housing parts to house a cushioning material for adjustment is fixed on the rear surface of the flexible plate, and the front surface of the flexible plate is positioned on the front surface of the back cushion. Accordingly, since the curvature of the two housing parts does not give a feeling of contact with the waist as it is, but acts as a feeling of contact with larger curvature by the flexible plate, pressure on the nervous series between a third and fourth lumbar vertebrae can be suppressed. Furthermore, by establishing the width of the border region between two housing parts to be within an appropriate range, it is possible to suppress any sense of lack of conformity or unpleasantness feeling due to there being too large a curvature as well as a feeling of excessive pressure on such nervous system.

The bulging member is not disposed independently in the back cushion, but is integrally formed with the flexible plate. Accordingly, by forming an insertion hole in a side portion of the back cushion, it is easily taken out or brought in while holding the flexible plate. As a result, for instance, by making the two housing parts in different sizes in advance, it is possible to easily place the larger housing part on the upper side or on the lower side to suit to user's preference. Furthermore, by adjusting the number of the cushioning materials for adjustment to be housed in each housing part, a minute adjustment becomes possible according to user's preference. Moreover, if a solid knitted fabric is used for a cushioning material for adjustment, high air permeability can be ensured. And if a stripped solid knitted fabric with edge treatment is used at that time, since an end treated periphery has a prescribed stiffness, which facilitates a loading work into the housing part and unloading work therefrom. When a structure having an air bag main body inside which a solid knitted fabric is housed, and air can be filled is used, since the elasticity of the solid knitted fabric is maintained even if air leakage occurs, it is fitted for a long usage without shortage of sense of supporting the human waist. In particular, since a desired elasticity is ensured by a solid knitted fabric without necessity of refilling air by pressurizing a pump even occurrence of air leakage, it is suitable to use as a lumbar support by incorporating it into a back cushion of a seat back on a driver's seat of a car seat or a back cushion of a cushion for a seat to be set on a car seat. Furthermore, by adjusting a filling amount of air, it is possible to let elasticity provided by air pressure and elasticity provided by a solid knitted fabric work synergistically, which makes it possible to variously adjust elasticity according to user's preference.

BRIEF DESCRIPTION OF THE DRAWINGS

FIG. 9 is a view showing a pulse wave muscle fatigue degree measured in the cases of installing a cushion for a seat loaded with a lumbar support having 15 mm of a border width (weld width) A on a seat structure (with Twin-Lumbar), and no attachment of the lumbar support (without Twin-Lumbar);

FIG. 11 is a view for explaining a measurement method of a load-to-deflection characteristic in a state of attaching a lumbar support to a cushion for a seat;

FIG. 12 is a view showing a load-to-deflection characteristic measured by the measurement method in FIG. 11;

FIGS. 17A and 17B are views showing the breathing change (FIG. 17A) and the pressure change of lumbar vertebra portion (FIG. 17B) when the cushion for a seat loaded with the lumbar support of the embodiment is attached;

FIGS. 18A and 18B are views showing the breathing change (FIG. 18A) and the pressure change of lumbar vertebra portion (FIG. 18B) when only the_cushion for a seat loaded without the lumbar support of the embodiment is attached;

DETAILED DESCRIPTION OF THE PREFERRED EMBODIMENT(S)

Figure 1:
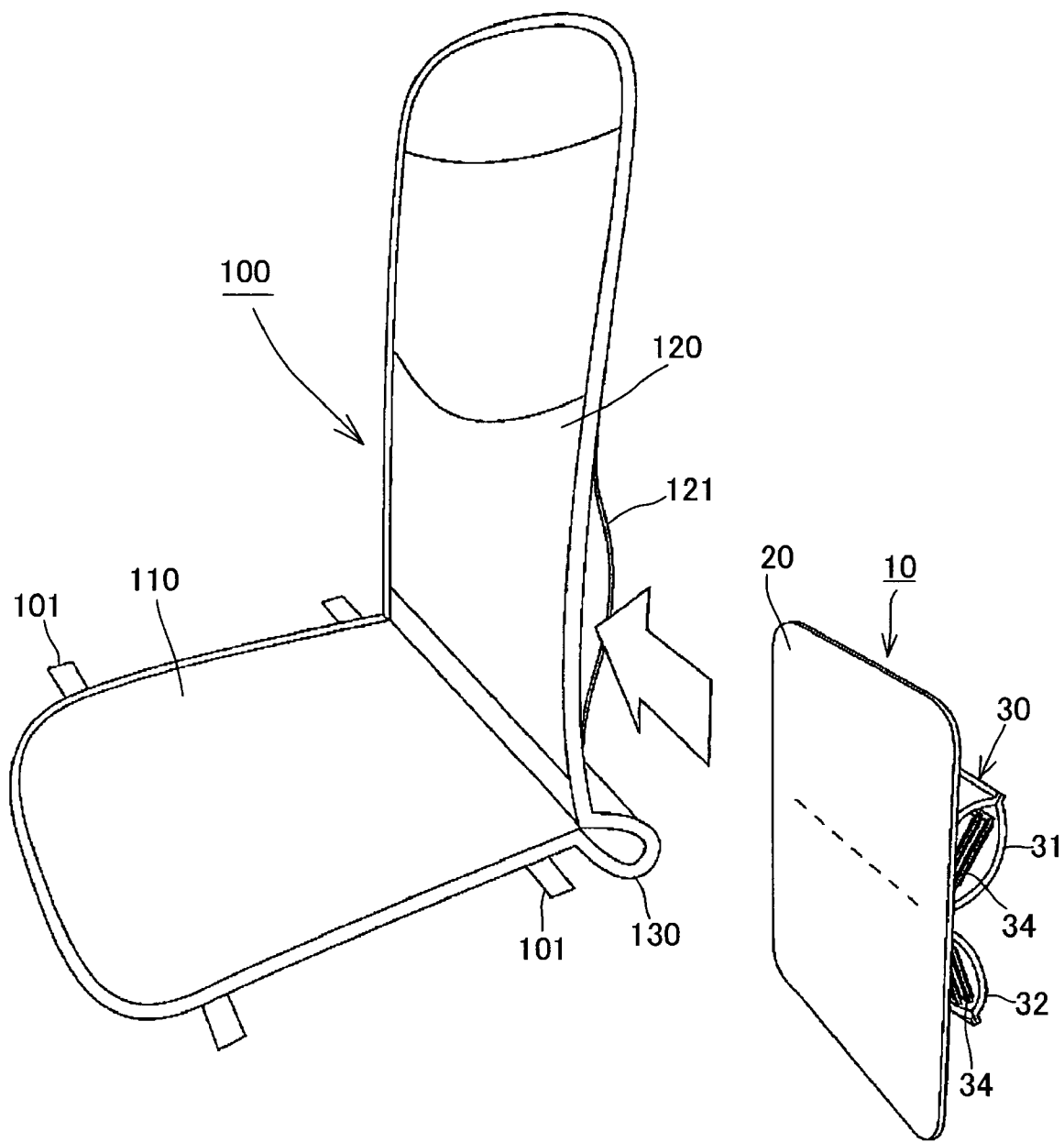
FIG. 1 is an external view of a lumbar support relating to an embodiment of the present invention and a cushion for a seat using the lumbar support.

The present invention will be further explained hereinafter based on embodiments of the present invention shown in the drawings. In the present embodiment, as shown in FIG. 1, a lumbar support 10 is loaded on a cushion for a seat 100 used while being fixed by a belt member or the like, placed on a seat cushion and a seat back of a seat structure for automobiles or the like.

Figure 2A:
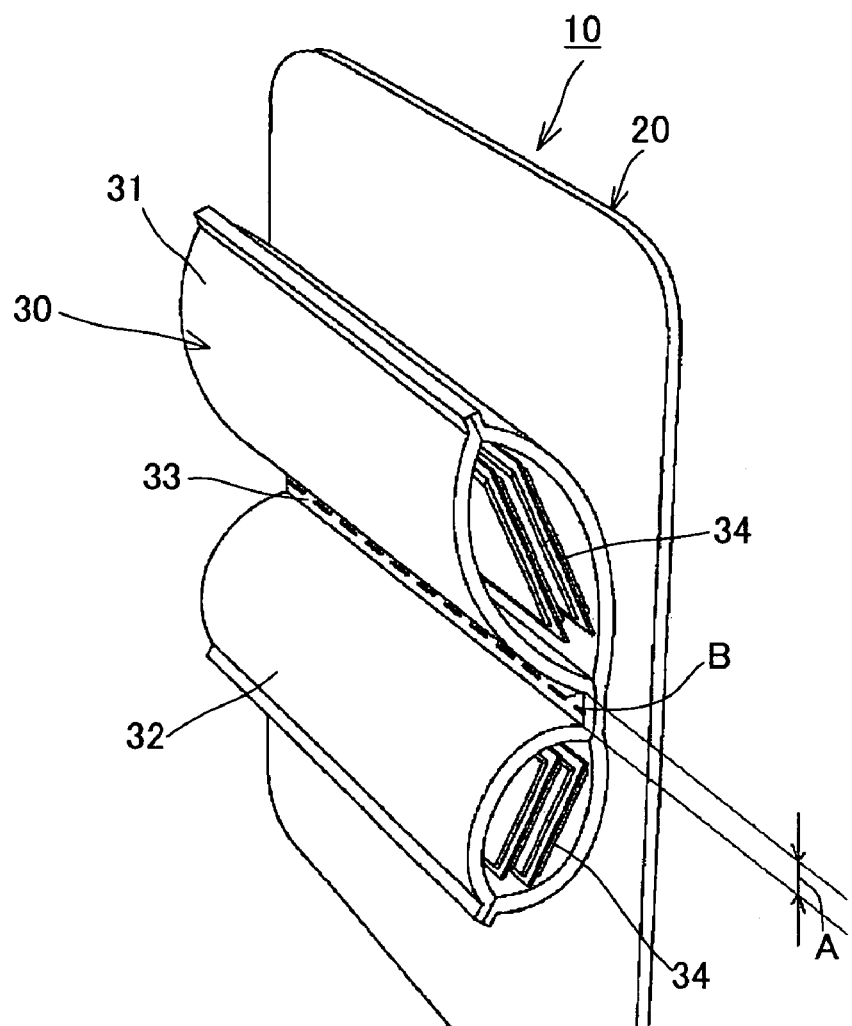
FIG. 2A is a detail view of the lumbar support relating to the embodiment.
Figure 2B:
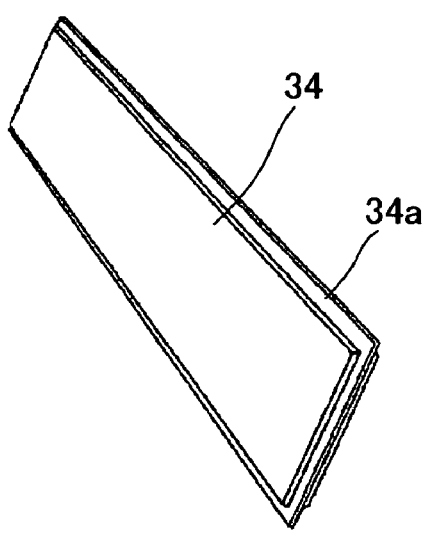
FIG. 2B is a view showing a cushioning member for adjustment.
Figure 10A:
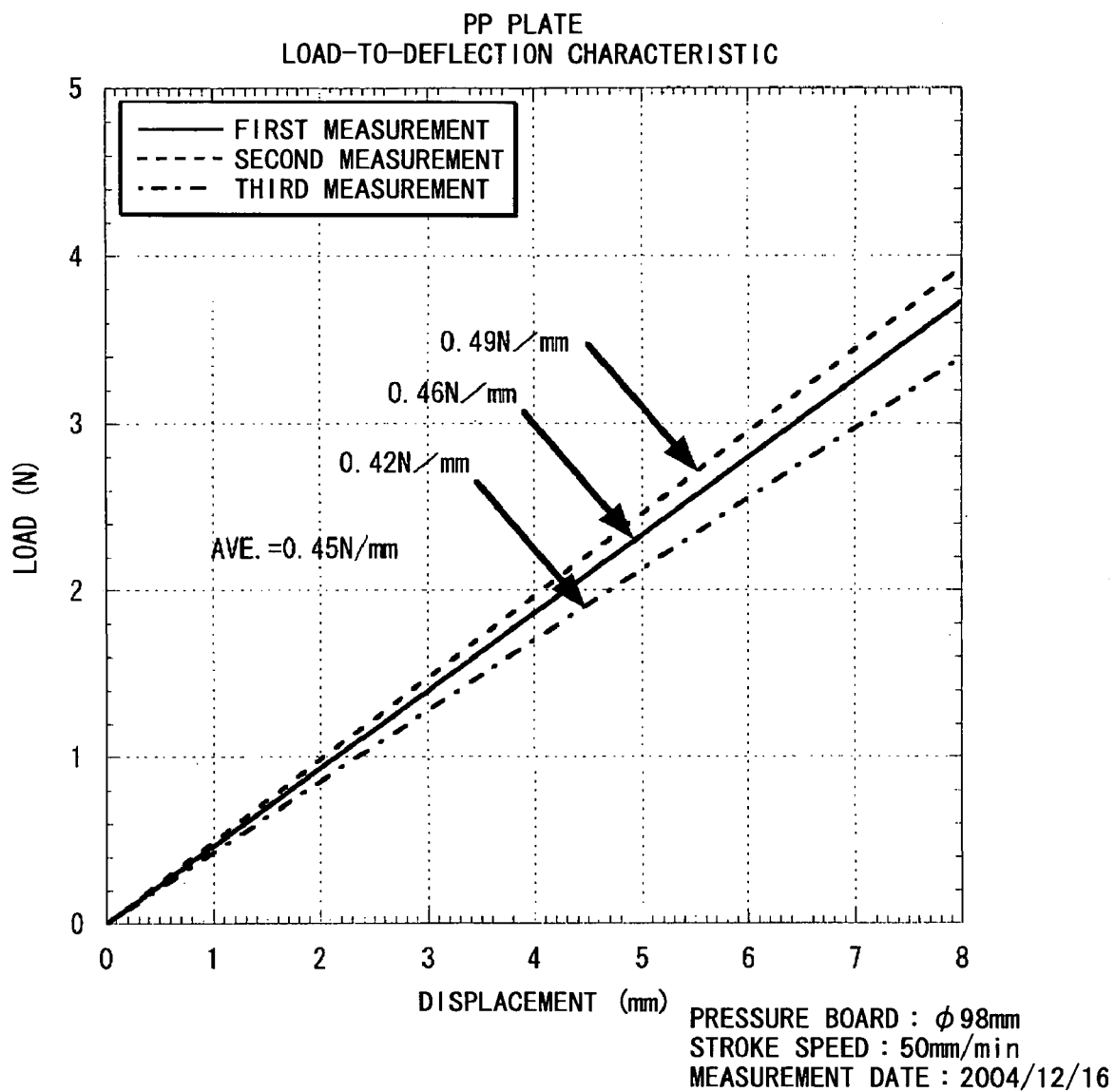
FIG. 10A is a view showing a load-to-deflection characteristic of a flexible plate.
Figure 10B:
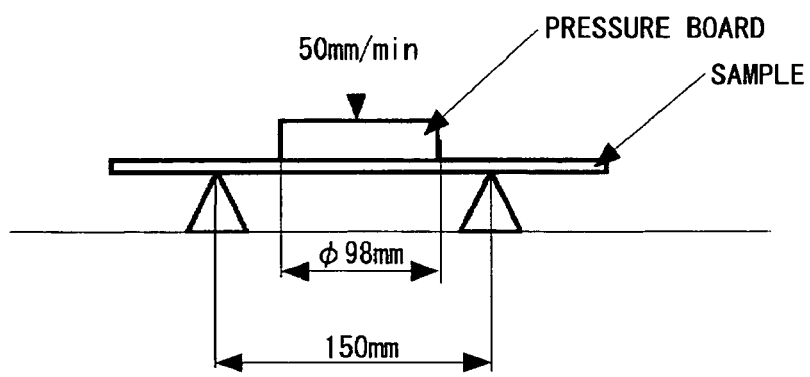
FIG. 10B is a view for explaining a measurement method thereof.

As shown in FIG. 1, FIGS. 2A and 2B, the lumbar support 10 has an integrated structure of a flexible plate 20 and a bulging member 30. The flexible plate 20 is made of plastic such as, for instance, polypropylene. The flexible plate 20 has a size larger than the size of a border region 33 between two housing parts 31 and 32 forming the bulging member 30 to be described later, and disposed to make a radius of an arc to bulge a back cushion large, to prevent pressure on a nervous system between a third and fourth lumbar vertebrae, and to obtain a curvature similar to a curve of a human spiral column. Accordingly, it is preferable that the size be roughly square or elliptical having a vertical length (longitudinal) from 150 mm to 300 mm and a horizontal length (lateral) from 200 mm to 400 mm. In order to obtain a curvature contacting with the curve of a human spiral column, it is preferable that the flexible plate 20, having a thickness of 0.8 mm to 2 mm, be provided with a spring constant in the range of 0.3 N/mm to 0.6 N/mm, and more preferably in the range of 0.4 N/mm to 0.5 N/mm obtained from a load-to-deflection characteristic from a measurement result in FIG. 10A while supporting a human spiral column at an interval of 150 mm, and pressed while adjusting the center of the flexible plate to the center of a pressure board having a diameter of 98 mm as shown in FIG. 10B. It should be noted that FIG. 10A is a measurement result on a flexible plate 20 made of polypropylene 1 mm in thickness. The measurements were performed three times, and 0.45 N/mm was obtained as the mean value of the spring constant.

The bulging member 30 is provided with two housing parts 31 and 32, and the border region 33 is formed between those two parts 31 and 32. More concretely, the bulging member 30 uses two pieces of solid knitted fabric, and the two housing parts 31 and 32 are formed in a tube with at least one open end by connecting one edge of the solid knitted fabric to that of the other piece of fabric, and the other edge of the solid knitted fabric to that of the other piece of fabric together, and at the same time, by connecting both opposing fabrics at their middle, with the connected portion at the middle serving as the border region 33 of the two housing parts 31 and 32. The solid knitted fabric (three dimensional net member) is that structured by reciprocating connecting yarn between a pair of ground knitted fabrics placed at a prescribed interval, and formed in a predetermined shape using a double raschel knitting machine or the like, and, for instance, can be used having such a structure as follows.

(1) Product Number: 49076D (manufactured by Suminoe Co. Ltd.) Material:
Ground knitted fabric on the front polyethylene terephthalate fiber false twist finished yarn
Ground knitted fabric on the back . . . combination of polyethylene terephthalate fiber false twist finished yarn and polytrimethylene. terephthalate monofilament
Connecting yarn . . . polytrimethylene terephthalate monofilament
Constant force extension percentage (8 cm wide, 10 kg, 10 min.)
the warp . . . 14.0%, the weft . . . 14.6%
Seam strength: the warp . . . 746 N, the weft . . . 537 N
Seam fatigue: the warp . . . 0.3 mm, the weft . . . 0.5 mm (2) Product Number: 49013D (manufactured by Suminoe Co. Ltd.) Material:
Ground knitted fabric on the front . . . polyethylene terephthalate fiber false twist finished yarn
Ground knitted fabric on the back . . . polyethylene terephthalate fiber false twist finished yarn
Connecting yarn . . . polytrimethylene terephthalate monofilament
Weight: 981 g/m$^2$
Thickness: 10.66 mm
Tensile Strength: the warp . . . 1531 N/50 mm, the weft . . . 1367 N/50 mm
Elongation: the warp . . . 68%, the weft . . . 107%
Constant force extension percentage (8 cm wide, 10 kg, 10 min.)
the warp . . . 15.5%, the weft . . . 38.5%
Residual distortion rate (8 cm wide, 10 kg, 10 min.)
the warp . . . 0.9%, the weft . . . 1.1%
Seam strength: the warp . . . 724 N, the weft . . . 869 N
Seam fatigue: the warp . . . 0.9 mm, the weft . . . 1.1 mm By using such a solid knitted fabric, roughly tube-shaped housing parts 31 and 32 can have elasticity, can give a predetermined cushioning property, and can suppress fustiness due to its high permeability. Though two pieces of solid knitted fabrics are used in the present embodiment, it is undoubtedly possible to make a similar structure by using one piece of solid knitted fabric and folding it over. The sizes of respective housing parts 31 and 32 are optional, they are preferably 50 mm to 100 mm in the vertical (longitudinal) direction and 150 mm to 250 mm in the horizontal (lateral) direction.

The bulging member 30 is attached by bonding the border region 33 onto the back surface of the flexible plate 20. It is preferable that a portion roughly parallel to a line B passing through nearly a central portion of the border region 33 in the width direction (A in FIG. 2A). Although the method of fixation is unspecified, fixation by sewing is preferable because it is easy and reliable. The ranges of preferable sizes of the flexible plate 20 and the bulging member 30 are as described above, the preferable combination of the flexible plate 20 and the bulging member 30 in terms of size is that a projected area of the bulging member 30 to the flexible plate 20 is smaller than an area of the flexible plate 20, in other words, the flexible plate 20 is larger than the projected area of the bulging member 30.

A width of the border region 33 formed by connecting the overlapped solid knitted fabrics (a vertical length when installed in the back cushion) A is preferably 12 mm to 25 mm. This is because that when the bulging member 30 is placed at the bottom and the flexible plate 20 at the top on a flat measurement surface, a length L1 of a practically flat surface including a portion corresponding to the border region 33 formed on the surface of the flexible plate 20 differs depending on the width A of the border region 33. In other words, the average distance between the third and fourth lumbar vertebrae in Japanese adults is about 40 mm. Therefore, when the length L1 of the practically flat surface is less than 40 mm, pressure may be placed on the nervous system etc., and on the contrary, when it is greater than 60 mm, it is not parallel to the curve of the spinal column, resulting in a sense of a lack of conformity with the spine. Then, by setting the width A of the border region 33 in the range from 12 mm to 25 mm, the length L1 of the practically flat surface becomes in the range from 40 mm to 60 mm when measured in a manner shown in FIG. 3.

Figure 4:
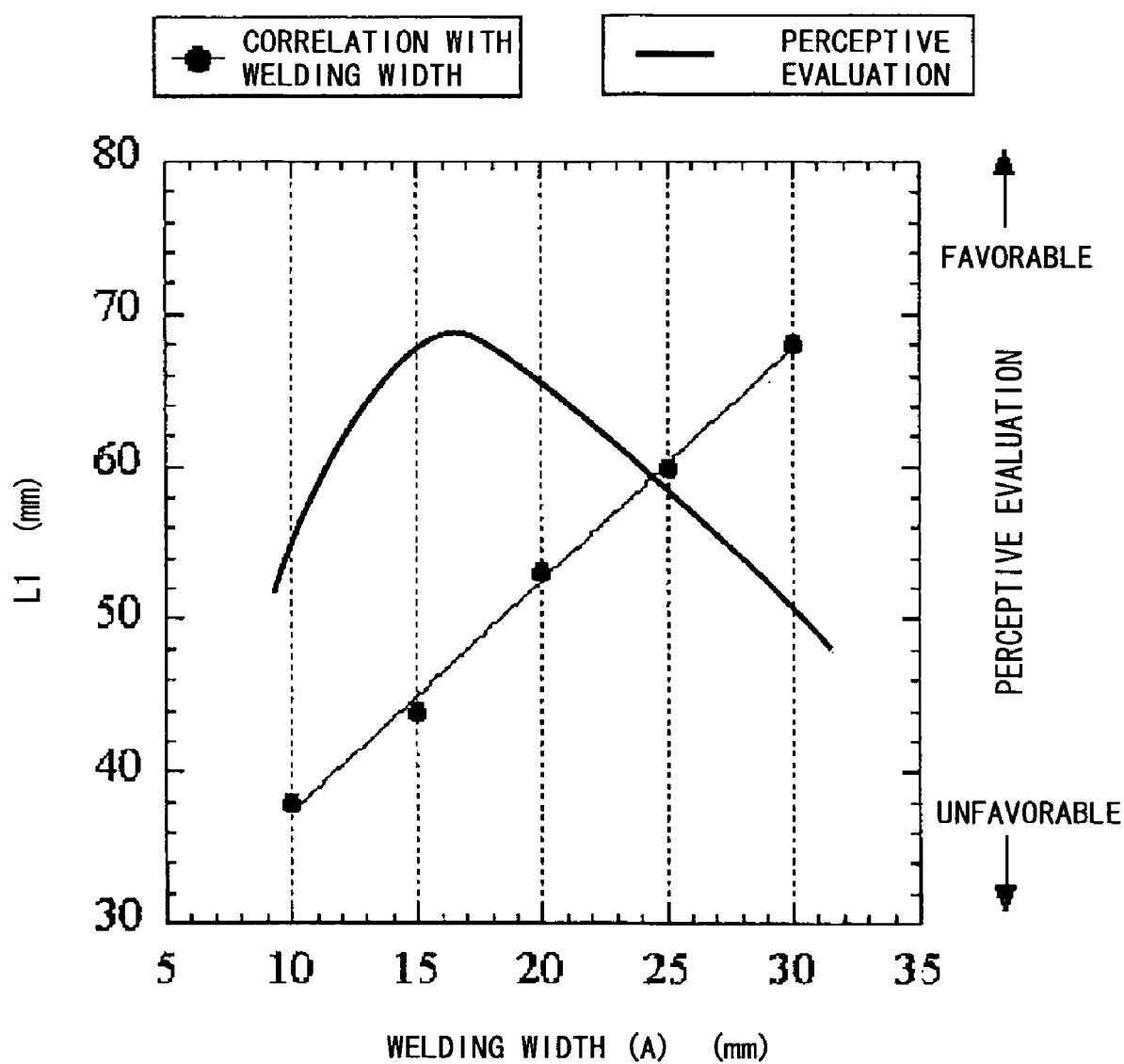
FIG. 4 is a view showing a result obtained by the test shown in FIG. 3.

FIG. 4 is a graph showing a relation between the width A of the border region 33 and the length L1 of the practically flat surface formed on the surface of the flexible plate 20, and the average value of a perception test of sitting comfort by 5 testees seating them on the cushion for a seat 100 shown in FIG. 1. As clear from the graph, when the width A of the border region 33 ("weld width" in FIG. 4) is from 12 mm to 25 mm, it is found that the length L1 of the practically flat surface falls in the range from 40 mm to 60 mm, and a perceptive evaluation for the sitting comfort is also high.

Figure 3:
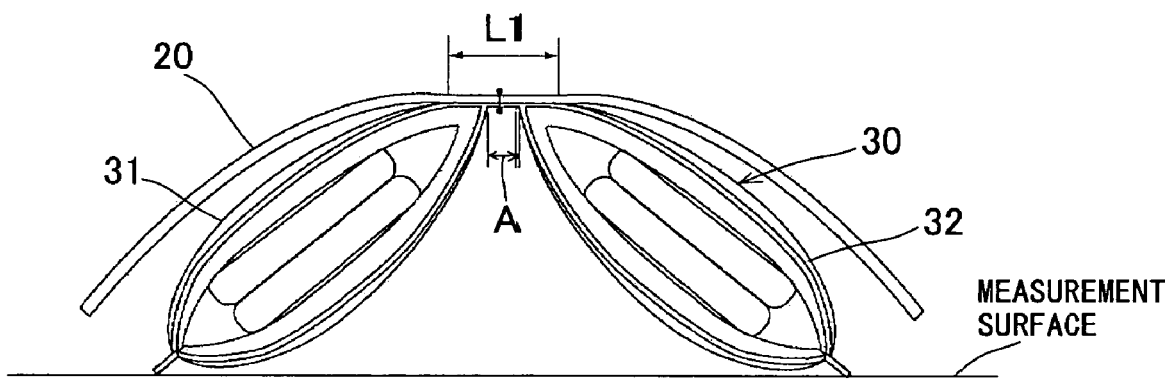
FIG. 3 is a view for explaining a measurement method of an test performed to establish an appropriate width of a border region of the lumbar support relating to the embodiment.

Since nearly center of the flexible plate 20 is fixed along a line B in FIG. 2 by sewing, when the flexible plate 20 is set in a manner as shown in FIG. 3, the area around the central portion (a central portion and around thereof) is somewhat depressed by the bulging member 30 and becomes a reverse W shape. An expression "practically flat surface" in the present specification is intended to include also the case of a reverse W shape due to depression of the central portion by 0.1 mm to 3 mm. A method to connect solid knitted fabrics to each other to form the border region 33 is unspecified; although a method of welding such as vibration welding or the like is preferable for easily establishing a firm connection.

The respective housing parts 31 and 32 formed across the border region 33 are preferably formed such that the sizes (volumes of respective inside spaces) differ from each other. By making each size different, the number of pieces of the cushioning material for adjustment 34 possible to be housed in the respective housing parts 31 and 32 differs. Therefore, for instance, change of the vertical direction of the flexible plate 20 according to user preference makes it possible to adjust the feeling of contact of the lumbar support 10 with the waist by loading the lumbar support such that the larger housing part is placed upward and the smaller housing part downward or vice versa.

As described above, the cushioning material for adjustment 34 is housed in the respective housing parts 31 and 32, it is preferable that the cushioning material for adjustment 34 is of a size houseable within the respective housing parts 31 and 32 in strips as shown in FIG. 2B. Formation in strips makes easy to load, unload, and handle the cushioning material through apertures formed in the ends of the housing parts 31 and 32, and to adjust the number of pieces of the cushioning material to be housed. Preparation of the cushioning member for adjustment 34 from a solid knitted fabric makes the surface friction resistance thereof smaller than if it were made of urethane material, which results in easy handling when loading or unloading. Furthermore, when a solid knitted fabric is used, it is preferable to give an end processing treatment by welding a fringe 34a by vibration welding or the like to prevent raveling of yarn. Since stiffness of the fringe 34a is enhanced by this treatment, taking it in and out to and from the housing parts 31 and 32 are further facilitated. In order to make adjustment of a delicate feeling of cushioning possible, it is preferable to prepare a plurality of pieces of the cushioning materials for adjustment 34 different in thickness and raw material.

The lumbar support 10 is used as a back cushion 120 of the cushion for a seat 100 to be incorporated therein as shown in FIG. 1. Specifically, a supporting cloth material 121 to support the lumbar support 10 is attached to the back surface of the back cushion 120. The flexible plate 20 is inserted between the back cushion 120 and the supporting cloth 121 from a side thereof in a direction such that the flexible plate 20 is placed on the surface side of the back cushion 120. Though not shown, an opening on the side between the back cushion 120 and the supporting cloth 121 is structured to be sealed with a fastener or the like after inserting the lumbar support 10.

At this time, according to user's physique or preference, either a larger one of the housing parts 31 or 32 is put on the upper side or on the lower side to insert into the opening between the back cushion 120 and the supporting cloth 121. The number of pieces to be housed of the cushioning material for adjustment 34 is adjusted according to user preference. Since the cushioning material for adjustment 34 is in a semi-floating state in the housing part 31, when a user's weight bears on it, it settles down to a position fitting the user's physique. As a result, it is possible to perform delicate adjustment, suiting the user's physique and preference.

A structure of the cushion for a seat 100 to dispose the lumbar support 10 is not limited, and any structure is applicable so far as the lumbar support 10 can be incorporated into the back cushion 120. However, as a bottom cushion 110 and the back cushion 120, it is preferable that the one made of a solid knitted fabric excellent in air permeability, and vibration absorbency is used. The cushion for a seat 100 is fixed to a seat structure of an automobile or the like with a band member 101 or the like, but it is preferable to structure it such that a bag 130 bulging out backward is formed by sewing or welding at the border region between the bottom cushion 110 and the back cushion 120, as shown in FIG. 1, and the bag 130 is inserted into a gap between a seat cushion and a seat back of a seat structure of an automobile or the like to suppress displacement of the cushion for a seat 100. It is preferable to make a structure such that the bag 130 bulges out through the gap between the seat cushion and the seat back to a position further backward of the seat bag, and a pipe material (not shown) to prevent it from slipping out is inserted through the bag 130.

The lumbar support 10 of the present embodiment can be directly incorporated into a back cushion (a cushion disposed on a seat back) of a seat structure of an automobile or the like, other than the usage for the cushion for a seat 100. This case is also the same as described above such that by forming the side of the back cushion openable, it is possible to change the vertical direction of the lumbar support 10, or to adjust the number of pieces of the cushioning material for adjustment to be disposed.

FIG. 5 to FIG. 8 are views showing test results performed to verify a further preferable width A of the border region 33. The tests were carried out such that the lumbar supports 10 prepared by changing the width (weld width) A from 10 to 30 mm (width error span in the direction along the border region 33 is within ±1 mm) at every 5 mm intervals were loaded on a cushion for a seat 100 formed from a solid knitted fabric shown in FIG. 1, which were installed on a seat structure of an automobile. Then testee A (a 34-year-old Japanese male with lumbago, 173 cm tall, and weighing 70 kg) was seated for the test. For comparison, measurement was also made for the case of seating directly on the seat structure without using the cushion for a seat 100 (expression of "without lumbar" is made in the drawings). As for the solid knitted fabric used for the cushion for a seat 100, both the bottom cushion 110 and the back cushion 120 are formed from the solid knitted fabric having a product number of 49076D manufactured by SUMINOE Co. Ltd. The structure of the lumbar support 10 was as follows.

(The Structure of the Lumbar Support 10)
the flexible plate 20
  material: polypropylene
  size: 200 mm long (vertical), 200 mm wide, thickness 1.0 mm
  flexibility: the average value of the spring constant 0.45 N/mm (refer to FIG. 10A)
the housing parts 31 and 32
  material: A solid knitted fabric (thickness 10 mm) of the product number 49076D (manufactured by SUMINOE Co. Ltd.)
  size: both are the same size
  70 mm in the vertical (longitudinal) direction. 190 mm in the horizontal (lateral) direction
the cushioning material for adjustment 34
  material: A solid knitted fabric (thickness 10 mm) of the product number 49076D (manufactured by SUMINOE Co. Ltd.)
  size: 40 mm in the vertical (longitudinal) direction, 180 mm in the horizontal (lateral) direction
  number of sheets: two sheets respectively for the housing parts 31 and 32

Figure 5:
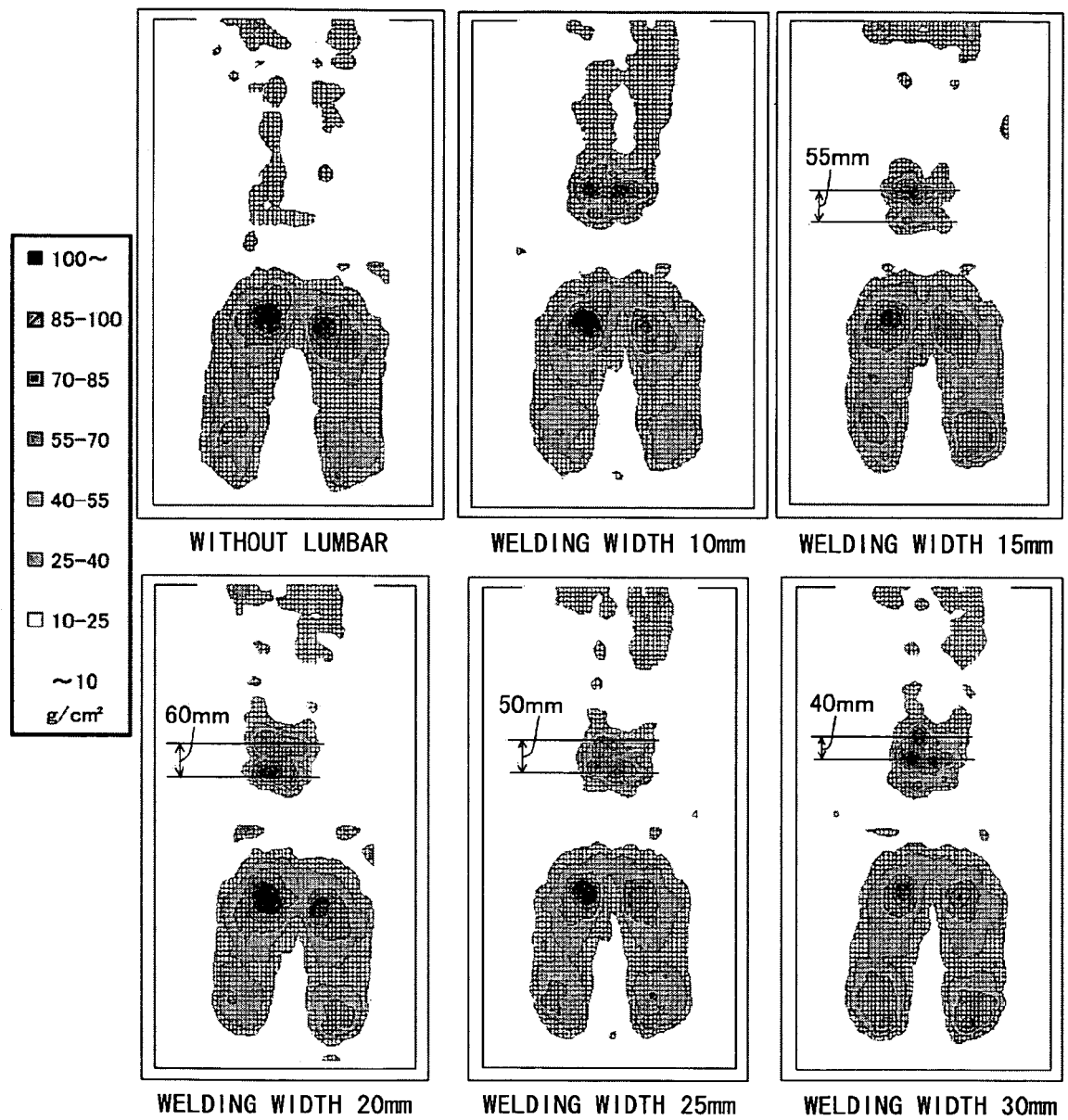
FIG. 5 is a view showing a measurement result of a body pressure distribution on a back cushion and bottom cushion, which is performed to verify a more preferable width of the border region.
Figure 6:
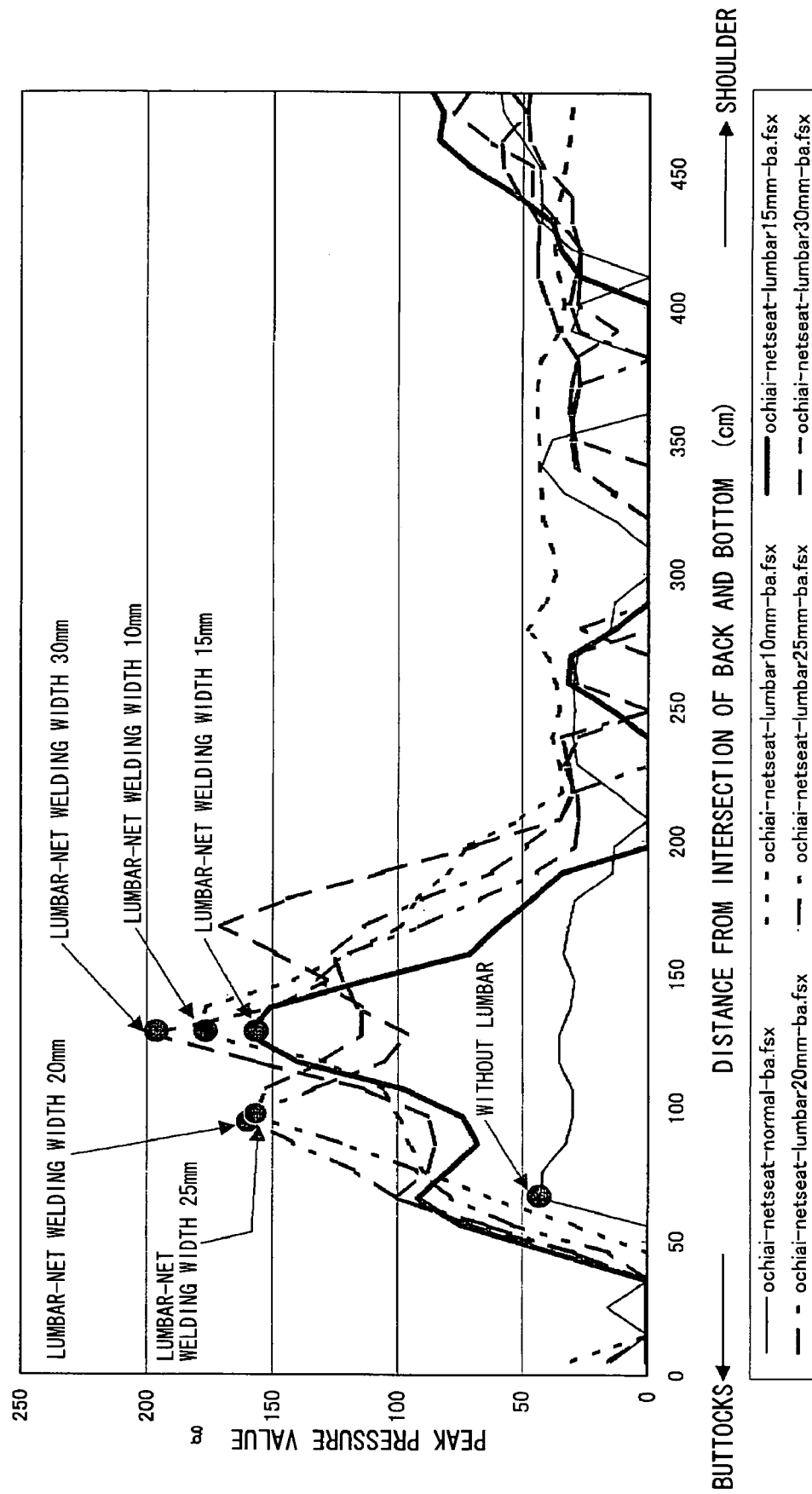
FIG. 6 is a graph showing a peak pressure value on the back cushion from the body pressure distribution obtained from FIG. 5 in relation to a distance from an intersection point of the back cushion with the bottom cushion for every weld width.
Figure 7:
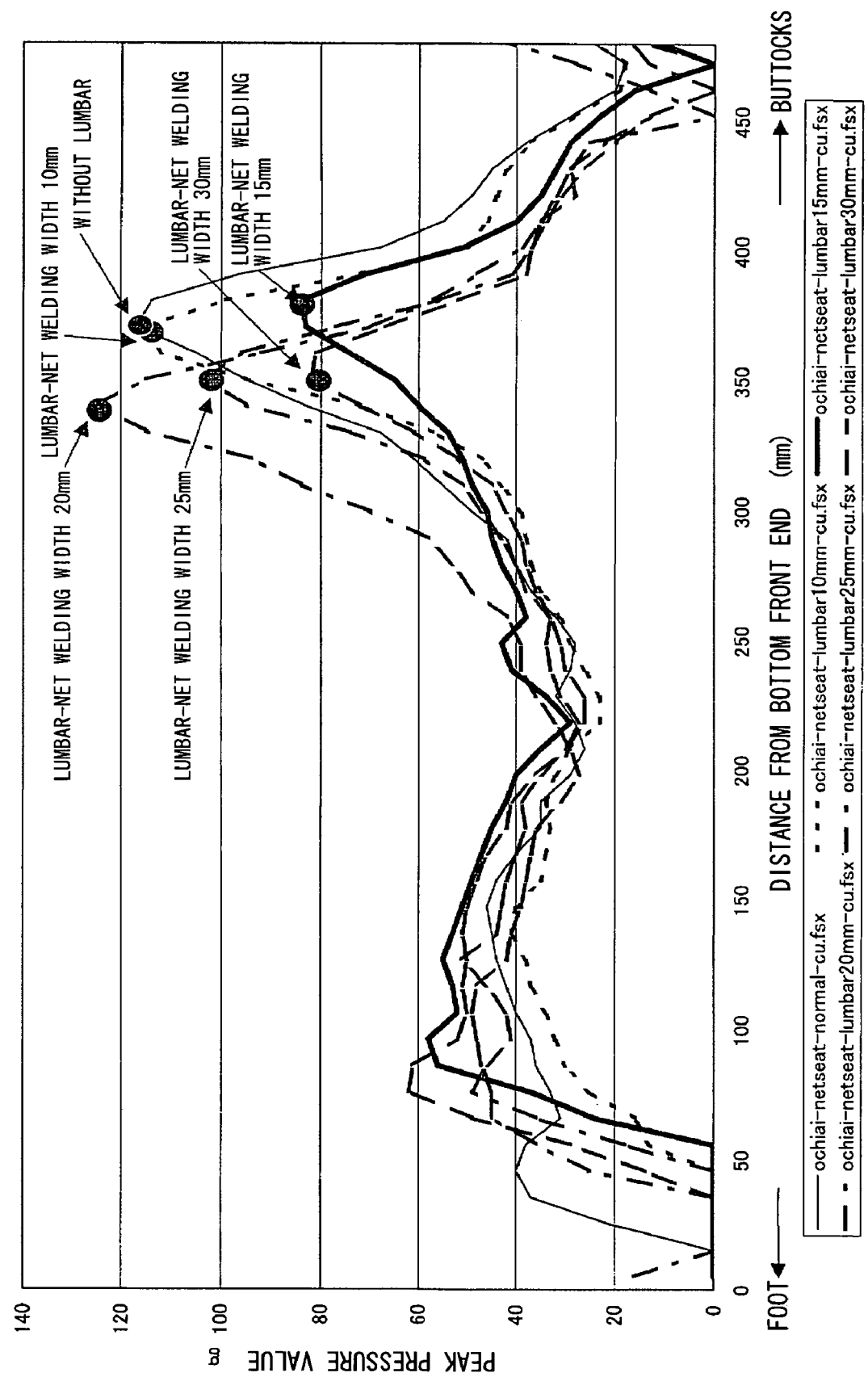
FIG. 7 is a graph showing a peak pressure value on the bottom cushion from the body pressure distribution obtained from FIG. 5 in relation to a distance from a front end of the seat in a seat structure of an automobile on which a cushion for a seat is mounted for every weld width.
Figure 8:
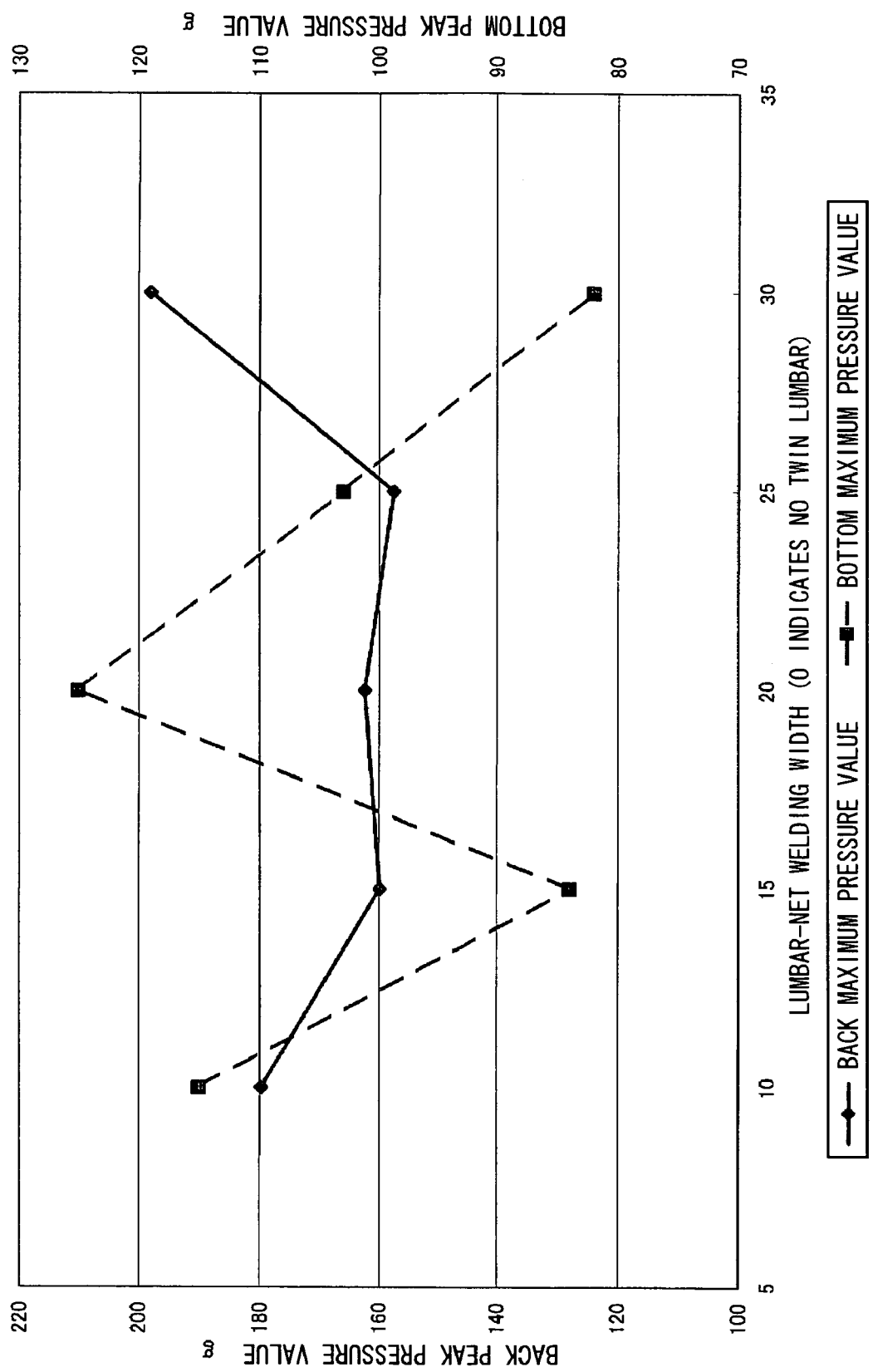
FIG. 8 is a graph comparing the maximum pressure values among respective peak pressure values on the back and bottom cushions shown in FIG. 6 and FIG. 7.

FIG. 5 shows a body pressure distribution in the back cushion and the bottom cushion, and FIGS. 6 and 7 show peak pressure values for respective portions in the back cushion or the bottom cushion from the body pressure distribution obtained from FIG. 5 in a graph form, and FIG. 8 is a view comparing maximum pressure values among respective peak pressure values in the back cushion and the bottom cushion.

It is found from FIG. 6 that in the back cushion, the peak pressure value in the case of "without lumbar" is the lowest, then the peak pressure value in the cases of the width (weld width) A of the border region 33 being 15 mm and 25 mm are the second lowest. The maximum pressure value in the case of "without lumbar" locates at about 60 mm from a border region between the back (the back cushion 120) and the bottom (the bottom cushion 110) toward the shoulder, but in the case of using the lumbar support 10, it locates in the vicinity of 90 mm to 130 mm, which shows that the portion between the third and the fourth lumbar vertebrae is reliably supported. And from FIGS. 5 and 6, in the case of using the lumbar support 10, two peaks of pressure value appear from 60 mm to 90 mm and from 90 mm to 130 mm, which shows that it can support two upper and lower points at the pelvis and the lumbar vertebra.

In the bottom cushion, though all the maximum pressure values appear within the range of 330 mm to 380 mm from the bottom front end of a seat structure, FIG. 7 shows relatively low maximum pressure values in the cases of the border width (weld width) A of 15 mm and 30 mm.

When the maximum pressure values of the back and bottom are compared as in FIG. 8, they are relatively low in the cases of the width (weld width) A of the border region 33 to be 15 mm and 25 mm, comparing to other cases. In particular, at 15 mm, since the maximum pressure value of the bottom is lower than that of 25 mm, a load can be scattered effectively, showing good balance in body pressure distribution. It is believed that the reason why the perceptive evaluation value is highest at the portion in the vicinity of 15 mm of the width (weld width) A of the border region 33 in FIG. 4 is that because the body pressure scattering effect is high.

Accordingly, it is found that the most preferable setting of the width (weld width) A of the border region 33 is 15 mm among the preferable range of 12 mm to 25 mm obtained from FIG. 4. Even in the case of taking account of weld width errors along the border region 33, it is preferable to be within ±2 mm at the maximum (namely, in the range of 13 mm to 17 mm in the weld width A), or within ±1 mm (namely in the range of 14 mm to 16 mm in the weld width A) around 15 mm.

Then, as for the case that the cushion for a seat 100 loaded with the lumbar support 10 of 15 mm in width (weld width) A of the border region 33 (within ±1 mm of the weld width error) (a Twin-Lumbar is loaded) is installed on a seat structure and the case that only a cushion for a seat not loaded with the lumbar support 10 is installed (without the Twin-Lumbar), the above-described testee having lumbago is seated on each seat structure for 30 minutes, and a pulse wave muscle fatigue degree is measured. The result is shown in FIG. 9.

The pulse wave muscle fatigue degree is calculated by a method proposed in Japanese Patent Application 2003-363902 applied by the present applicant. This method is carried out in such a manner that a finger top volume pulse wave is measured by an optical finger top pulse wave meter, a peak values of each cycle of the raw waveform of time-series data of the finger top volume pulse wave thus obtained is detected, and from thus obtained each peak value, a difference between a peak value of the upper limit side and a peak value of the lower limit side for every predetermined time range is calculated. Setting this difference as a power value, inclination of the power value to time axis in a predetermined time range is calculated by slide-calculating prescribed number of times at a prescribed lap rate with respect to the predetermined time. Further, the power-value inclination is subjected to absolute value processing so as to calculate its integrated value to be defined as a fatigue degree. Since a correlation between the integrated value and perceptive evaluation is found, the integrated value is used as a pulse wave muscle fatigue degree.

As clear from FIG. 9, when the cushion for a seat 100 provided with the lumbar support 10 having the weld width 15 mm is installed, accumulation of fatigue degree is found to be largely reduced, when compared with the case of no installation of the cushion for a seat 100.

The cushion for a seat 100 loaded with the lumbar support 10 used at the time of measuring the pulse wave muscle fatigue degree in FIG. 9 and the cushion for a seat 100 loaded with an air cushion type lumbar support are placed on a flat measurement surface so that the flexible plate 20 is on the upper side as shown in FIG. 11, and the load-deflection characteristic is measured, applying pressure at 50 mm/min with a pressure board having a diameter of 200 mm. The result is shown in FIG. 12. FIG. 12 shows data for a "3D net type assembly" loaded with the lumbar support 10, and "air type assembly" which is data for that loaded with the air cushion type lumbar support. The air cushion type lumbar support is provided with two air bags which become the same size as the housing parts 31 and 32 when air is filled, and other formations are structured similarly to that of the lumbar support 10.

When one is seated on a seat for a vehicle, about 20% of the weight is generally applied on a seat back. The load of 16 kg is applied when the body weight is 80 kg. The load applied on the lumbar vertebra is considered to be half thereof, 8 kg, estimating a little too much. If an inertia force of maximum 1.5 G is added during traveling, the load of maximum 12 kg is expected. Accordingly, in a case of using a cushion for a seat loaded with a lumbar support is installed on a real seat for a vehicle, 8 kg to 12 kg (78 N to 118 N) of load is estimated to be applied on the lumbar vertebra, amounting to 235 N in a case of 160 kg of the body weight.

When looking at FIG. 12, the load-deflection curve of the 3D net type is found to be nearly linear in the range from 78 N to 235 N. When a displacement is generated on the lumbar vertebra by vibration or shaking during traveling, especially a large displacement by rapid acceleration, cornering, traveling over a bad road, a pressure is kept constant without causing an increase of rapid reaction force due to the characteristics. A spring constant in this linear range is 2 kg/mm or below, which is in the range not to be felt as a strong pressure. If a spring constant in this linear range is 1 kg/mm or below, it is nearly the same as a reaction force from the muscle. Therefore, if possible, about 1.5 kg/mm is ideal, and as is clear from FIG. 12, the 3D net type has a value close to it. Thus, since pressure fluctuation at the lumbar vertebra is small, and the spring constant is set a little higher than the reaction force from the muscle, there is a feeling of there being a light pressing against the waist.

On the contrary, since the load-deflection curve is non-linear in the range from 78 N to 235 N in the air type, a rapid increase in reaction force occurs when a large displacement is generated on the lumbar vertebra, and the spring constant in this non-linear range exceeds 2 kg/mm, and this reaction force increase is in a range perceivable as a strong pressure.

A lumbar support greatly influences posture maintenance ability and fatigue accumulation which affect the comfort of a seated person. Since the 3D net type lumbar support has a linear characteristic when pressurized with the pressure board of 200 mm in diameter as described above, and since the spring constant in the linear range is low, it is possible to provide a greater sitting and riding comfort compared with the air type lumbar support.

Figure 13:
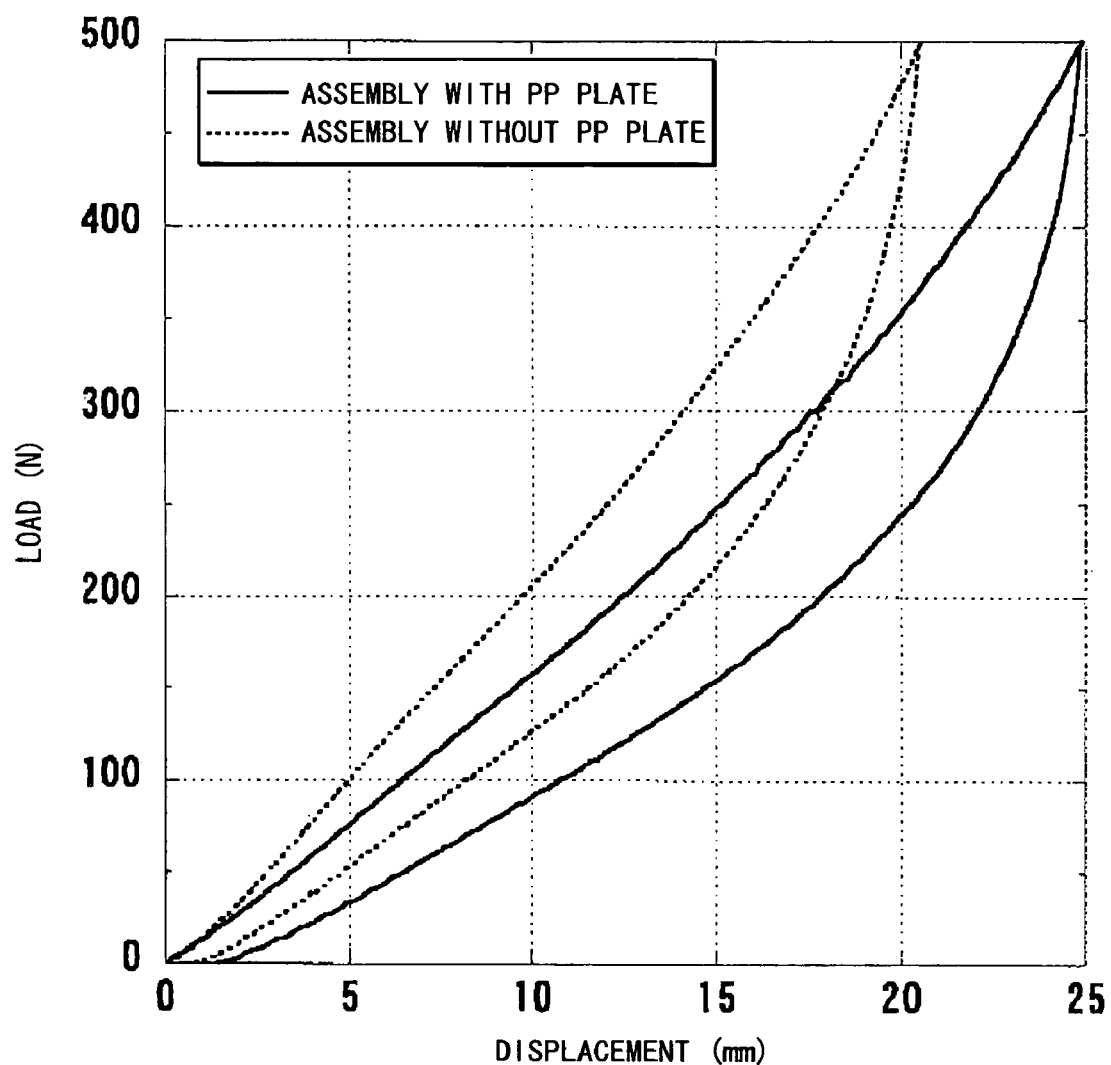
FIG. 13 is a view showing a load-to-deflection characteristic in a state of attaching a lumbar support provided with a flexible plate and a lumbar support not provided with a flexible plate to respective cushions for a seat.

FIG. 13 is a view showing comparison of a load-deflection characteristic of "3D net type assembly" in FIG. 12 (indicated as "assembly with a PP plate" in FIG. 13) to a load-deflection characteristic of a cushion for a seat loaded with a lumbar support consisted of only a bulging member without the flexible plate 20 (PP plate) (indicated as "assembly without a PP plate in FIG. 13). Note that the structure of the "assembly without a PP plate" is the same as that of the "assembly with a PP plate" except that it is not provided with the flexible plate. The measurement conditions are the same as those in FIG. 12.

As shown in FIG. 13, when the "assembly without a PP plate" is compared with the "air type assembly" in FIG. 12 similarly to the "assembly with PP plate", the linearity is found higher. However, the "assembly with a PP plate" provided with the flexible plate 20 is high in linearity, and the spring constant in a linear range at about 1.5 kg/mm is much lower than that of the "assembly without PP plate" which is not provided with the flexible plate 20, as described above, which makes it possible to disperse pressure to the waist more effectively. Accordingly, a lumbar support which disposes the flexible plate 20 on the side in contact with the human back can provide support function to the waist more effectively than a lumbar support provided with only two convex portions.

Figure 14:
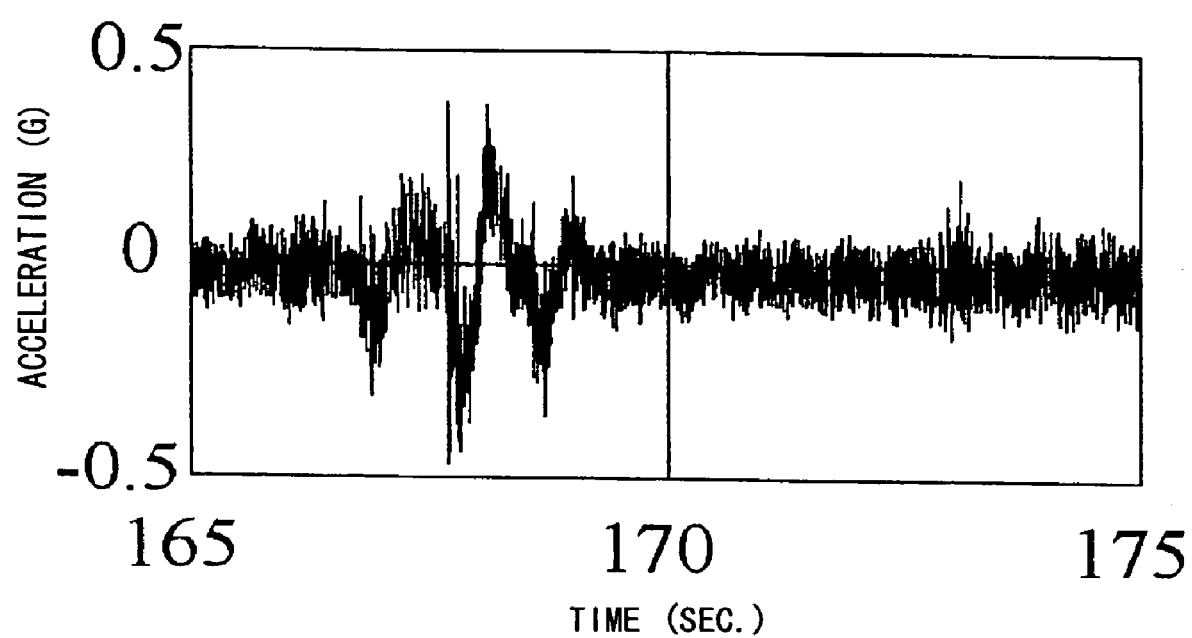
FIG. 14 is a view showing a portion of waveform of excited waves when a vibrator is operated in a seating fatigue test and a fatigue reduction test.
Figure 15:
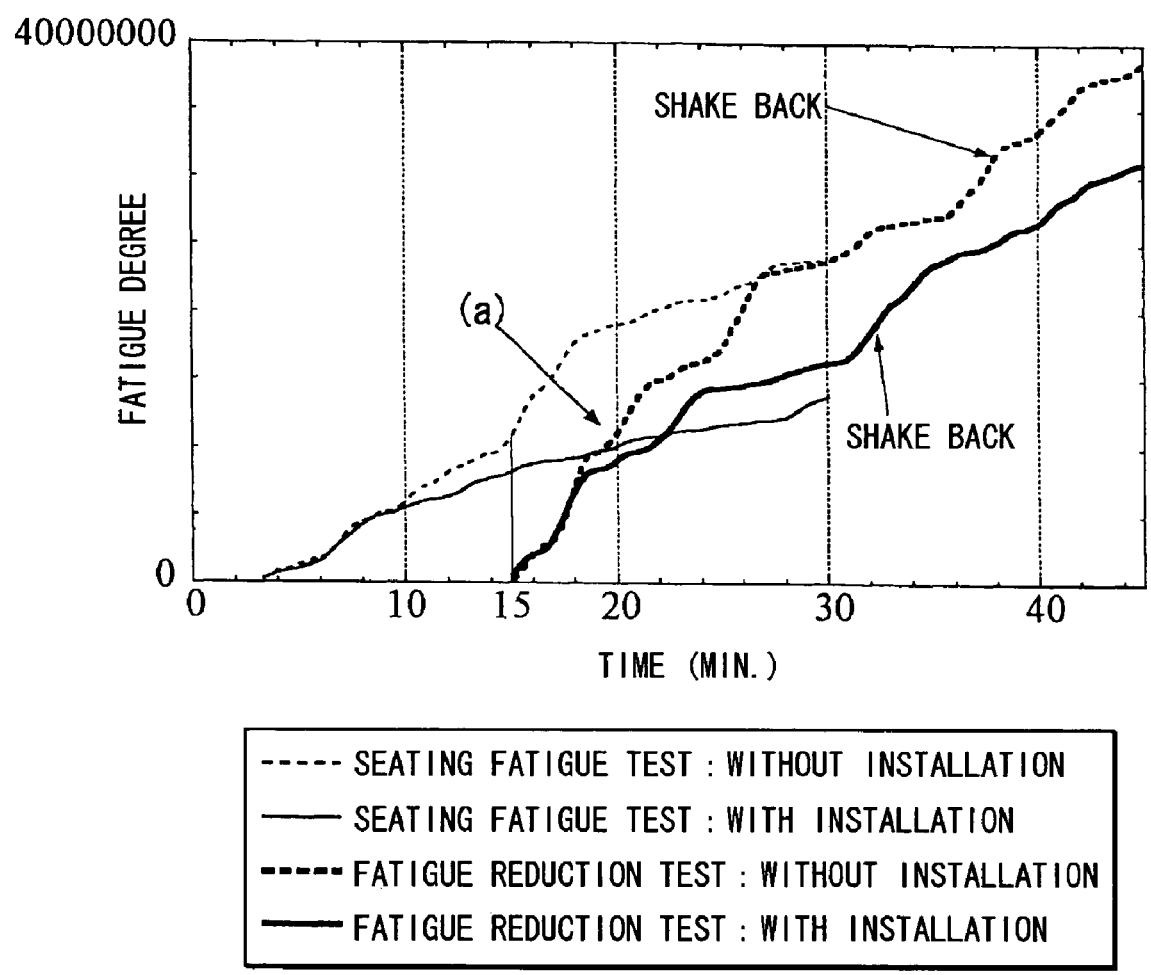
FIG. 15 is a view showing results of the seating fatigue test and the fatigue reduction test.

A dynamic fatigue test performed such that each seat structure installed on a platform of a vibrator is vibrated by an excited wave taken by actually traveling a road with a testee seated thereon both with a cushion for a seat 100 loaded with the lumbar support 10 as shown in FIG. 9 (expressed as "loaded" in FIG. 15) and with a cushion for a seat with no lumbar support 10 loaded (expressed as "no loaded" in FIG. 15). FIG. 14 shows a portion of the excited waves, which is a random wave containing irregular vertical vibration as appeared in the range from 165 sec to 170 sec in FIG. 14. Testee was a healthy Japanese male in his thirties without lumbago, weighing 68 kg. Two types of tests were carried out. One was a seating fatigue test wherein the seat was vibrated for 30 minutes with the excited wave shown in FIG. 14 immediately after the testee had taken a seat in a relaxed posture with the back resting against a back cushion, and the other was a fatigue reduction test keeping the testee seated for the first 15 minutes in a tense posture with his back away from the surface of the back cushion, thereafter vibrating for 30 minutes with the excited wave shown in FIG. 14 with the testee in a relaxed posture with his back resting against the back cushion while detecting the change in the testee's fatigue. The results are shown in FIG. 15. Note that as fatigue degree, the pulse wave muscle fatigue degree similar to that in the test in FIG. 9 is measured.

In the seating fatigue test, nearly the same degree of fatigue is seen for 10 minutes from starting of the test, but a great alienation is seen between two cases of whether or not the lumbar support 10 is provided after 15 minutes, and it is found that accumulation of fatigue is smaller in the case of installing the cushion for a seat 100 loaded with the lumbar support 10. On the other hand, in the fatigue reduction test, since a tense posture is kept for 15 minutes, a fatigue degree rapidly increases after starting of vibration in the case of the cushion for a seat not loaded with the lumbar support. The fatigue degree passes a fatigue degree in the case of installing the cushion for a seat 100 loaded with the lumbar support 10 at (a) point after 5 minutes (after 20 minutes in FIG. 15) in the seating fatigue test, and it abruptly increases further 10 minutes to 13 minutes after starting of vibration (after 25 minutes to 28 minutes in FIG. 15), and thereafter, the fatigue degree is seen to increase in similar manner of change to the fatigue degree of the cushion for a seat without lumbar support 10 in the seating fatigue test. On the other hand, in the case of installing the cushion for a seat 100 loaded with the lumbar support 10, a rapid increase in the fatigue degree is seen similarly to the case without the lumbar support 10 until three minutes after starting of the vibration (after 18 minutes in FIG. 15). However, a fatigue accumulation tendency is clearly milder thereafter than in the case without the lumbar support 10, though some changes such as a shake-back is seen owing to the fatigue caused by a tense posture taken in advance. Accordingly, it is found that a fatigue reduction effect is higher in the case with the lumbar support 10 compared to the case without the lumbar support 10.

Figure 16:
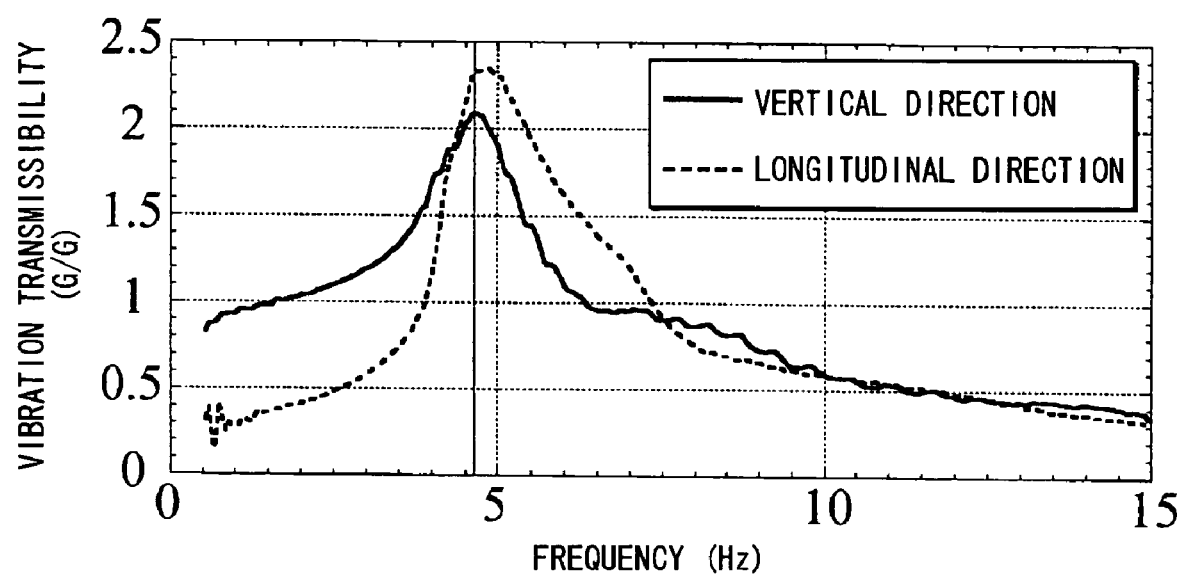
FIG. 16 is a view showing vibration transmissibility (G/G) of a car seat used when measuring a breathing change and a pressure change of lumbar vertebra portion.

In a seating state of the above-described Japanese male of 68 kg in weight, a car seat was attached on a platform of a vibrator, acceleration sensors were attached to a bottom cushion of the seat in the vicinity corresponding to below the ischium node and to a back cushion of the seat in the vicinity corresponding to an upper portion of the pelvis, then the car seat was vibrated with a sine wave of one side amplitude 1 mm (amplitude between the upper and lower peaks: 2 mm), changing the vibration frequency from 0.5 Hz to 15 Hz for 180 sec, and vibration transmissibility (G/G) in the vertical direction and horizontal direction of the seat was measured. The result is shown in FIG. 16. It is found from FIG. 16 that when the testee is seated on the seat, resonance is at about 4.6 Hz.

Respiratory fluctuation and pressure fluctuation on the lumbar vertebra of the testee were measured respectively for the case of installing the cushion for a seat 100 loaded with the lumbar support 10 and the case of installing only a cushion for a seat without the lumbar support 10. The respiratory fluctuation was measured by attaching a commercially available respiratory pickup (TR-751 T manufactured by NIHON KOHDEN CORPORATION Co. Ltd.) to a breast of the testee, and the pressure fluctuation on the lumbar vertebra was measured by providing a piezoelectric element film on the back cushion of the cushion for a seat 100 at a position corresponding to the vicinity from the third to fourth lumbar vertebrae. FIGS. 17A and 17B show the results of the test in which the cushion for a seat 100 loaded with the lumbar support 10 is installed, and FIGS. 18A and 18B shows the results of the other test in which only a cushion for a seat without the lumbar support 10 is installed. FIGS. 17A and 18A show the respiratory fluctuation, and FIGS. 17B and 18B show the pressure fluctuation on the lumbar vertebra. All these figures from FIG. 17A to FIG. 18B show a portion of the time series fluctuation during from 150 sec to 160 sec caused by vibrating at a vibration frequency of about 4.6 Hz, which is a resonance point. It should be noted that in the graphs in FIGS. 17A, 17B and FIGS. 18A, 18B, the vertical axes are all indices showing magnitude of the fluctuation and the numerical values thereof in the figures are values having no unit.

When FIGS. 17A, 17B and FIGS. 18A, 18B are compared, it is found that the respiratory fluctuation and the pressure fluctuation on the lumbar vertebra fluctuate in synchronization with each other in the vicinity of resonance point in the case of provided with the lumbar support 10. In other words, in the case of loading the lumbar support 10, vibration energy inputted from the vibrator is utilized for the pressure fluctuation on the lumbar vertebra in synchronization with the respiratory fluctuation, which makes respiratory movement easily. Accordingly, when FIG. 17A and FIG. 18A are compared, the magnitude of amplitude of the respiratory fluctuation in the case shown in FIG. 17A where the lumbar support 10 is loaded is smaller than in the case shown in FIG. 18A by about 40%, showing realization of easy respiratory movement. In other words, a movement of the lumbar support 10 linking to breathing causes a minute movement of the spinal column without changing the posture largely, helping a respiratory movement and reducing proceeding of fatigue. Furthermore, a minute movement of the waist (spinal column) without accompanying a large posture change helps metabolism (wastes removal, supplement of nutrition) of an intervertebral disk serving as a cushioning material between respective bones of the spinal column, which also serves to moderate a load on surrounding muscle, therefore, due to these overall effects, proceeding of the fatigue is reduced.

Figure 19:
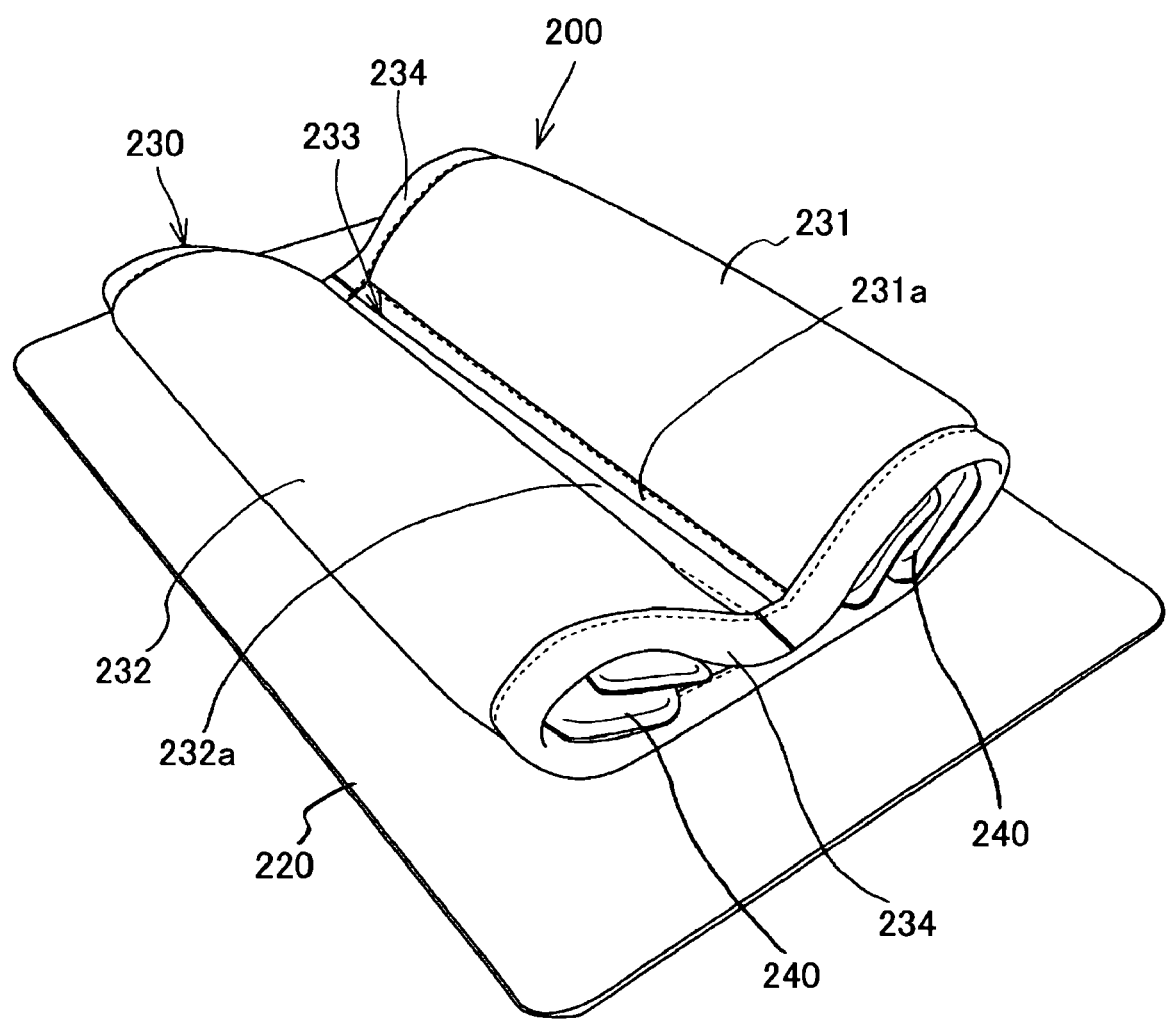
FIG. 19 is a view showing a lumbar support relating to other embodiments of the present invention.

FIG. 19 is a perspective view showing a lumbar support 200 relating to the other embodiment of the present invention. The lumbar support 200 of the present embodiment is the same as the above-described embodiment in such that a flexible plate 220 is integrated with a bulging member 230, and each material and their preferable sizes of the flexible plate 220 and the bulging member 230 are the same as those in the above-described embodiment. However, the two points differ from the above-described embodiment as follows. The bulging member 230 is not consisted of two sheets of solid knitted fabric but two housing parts 231 and 232 thereof are formed with a sheet of solid knitted fabric, and a cushioning material for adjustment 240 differs in structure from each other.

More concretely, the bulging member 230 of the present embodiment is formed such that one sheet of the solid knitted fabric is folded back at near both ends, respective edges 231a and 232a are abutted at the central of the fabric, near the respective edges 231a and 232a are sewed on respective portions positioned at the undersides of the solid knitted fabric in FIG. 19 at an interval of about 15 mm similarly to that in the above-described embodiment, so that a border region 233 is formed between respective housing parts 231 and 232. The open edges of the respective housing parts 231 and 232 are covered with a cloth material 234 in a manner to tie around to prevent raveling of edges of the solid knitted fabric. Though two sheets of the solid knitted fabric are connected by vibration welding in the above-described embodiment, by forming in this manner, a stiff portion created by the vibration welding is not formed at the ends or open edges of the respective housing parts 231 and 232, which gives a merit of not giving the feeling of a hard contact when being seated. The bulging member 230 thus formed is fixed by sewing to the flexible plate 220 through a slight gap in a contacted portion between the respective edges 231a and 232a.

Figure 20:
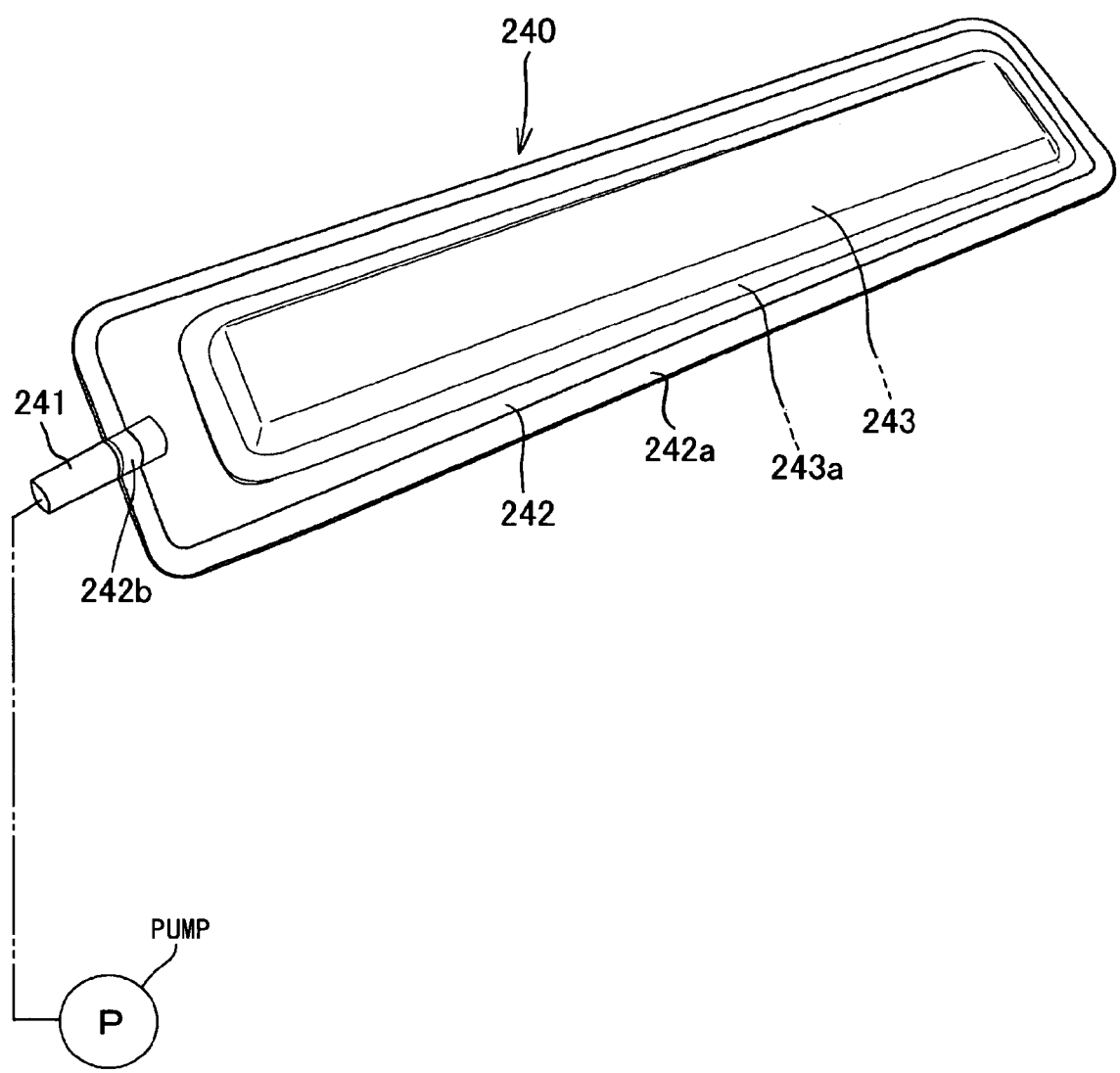
FIG. 20 is a view showing a cushioning material for adjustment used in the lumbar support relating to above-described other embodiments.

The cushioning material for adjustment 240 has a structure shown in FIG. 20. That is, the cushioning material for adjustment 240 comprises: an air bag main body 242 including a connecting tube 241 serving as an opening for air-flow, connected to a pump for filling air, and holding air filled inside via the connecting tube 241 to form an air room; and a solid knitted fabric 243 disposed in the air bag main body 242. Accordingly, the use of the cushioning material for adjustment 240 makes it possible to adjust the feeling of cushioning through adjustment of air volume filled by a manually operated pump. In addition to that, as shown in FIG. 19, the cushioning material for adjustment 240 can be disposed by putting on top of each other in the respective housing parts 231 and 232 by each two sheets, or can be disposed in the respective housing parts 231 and 232 by each one sheet or by three sheets or more on top of each other. It is the same as the above-described embodiment that the feeling of cushioning can be adjusted.

The air bag main body 242 is prepared in a bag shape by using two sheets of a welding sheet to weld the peripheral edge 242a together. The solid knitted fabric 243 is formed to a shape and size housable in the air bag main body 242, and has a predetermined thickness. The structure of the solid knitted fabric 242 is knitted by reciprocating a connecting yarn between a pair of ground knitted fabrics placed at a predetermined distance, similarly to the cushioning material for adjustment 34 used in the above-described embodiment, and materials shown as an example can be used. The solid knitted fabric 243 can be used in one sheet, or two sheets or more in a laminated form. It is preferable that a periphery 243a around the solid knitted fabric 243 is welded while pressing it to become thin in thickness by vibration welding to treat so as to prevent raveling from a cut surface.

When the cushioning material for adjustment 240 prepared by embedding such the solid knitted fabric 243 in the air bag main body 242 is used, elasticity of the solid knitted fabric 243 works even when air leakage occurs through a slight gap between the connection tube 241 to be connected with a pump and a connection part 242b of the air bag main body 242 supporting the connection tube 241, which lowers an elastic function created by air pressure. Accordingly, as distinct from an well-known air cushion which is made only by filling air, it is possible to exhibit the function as the cushioning material for adjustment 240 stably and for a long time owing to the elasticity of the solid knitted fabric 243. Furthermore, elasticity due to air pressure and elasticity of the solid knitted fabric 243 can be functioned together by adjusting an amount of air filled into the air bag main body 242, a degree of freedom to select a feeling of support to suit a user can be expanded. Since the solid knitted fabric 243 is provided with high surface stiffness with small reaction force, and has a characteristic to easily fit to a human body, it is easy to obtain a desirable cushioning property even with a small filling amount of air. In a case of the conventional air-cushion to fill air only, a filling amount of air is apt to be excessive in order to obtain a high surface stiffness, which sometimes results in a feeling of hard contact contrarily. However, according to the present embodiment, it is possible to obtain a high surface stiffness and a comfortable feeling of cushioning fitting to a human body owing to the characteristic of the solid knitted fabric 243 without filling air excessively.

Figure 21:
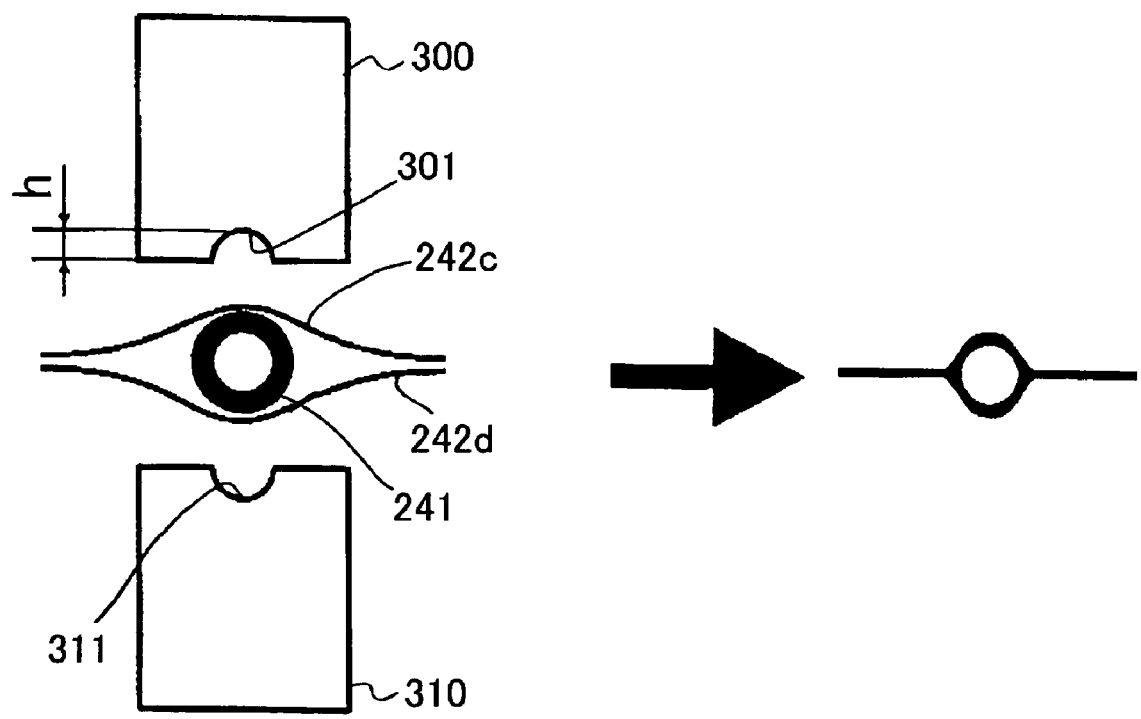
FIG. 21 is a view for explaining a preferable method of manufacturing a cushioning material for adjustment relating to the above-described other embodiments.

The air leakage from the cushioning material for adjustment 240 filled with air as described-above occurs mainly at a connection between the connecting part 242b of the air bag main body 242 and the connection tube 241. Therefore, when connecting the connecting part 242b of the air bag main body 242 with the connection tube 241, it is preferable to connect them not to occur air leakage as much as possible. More concretely, it is preferable that, as shown in FIG. 21, the connection tube 241 is placed between two pieces of welding sheets 242c and 242d composing the air bag main body 242, an upper part 300 and a lower part 310, in which the depth h of abutting parts 301 and 311 is smaller than the outer diameter of the connection tube 241, and the cross section of a circular cavity portion formed by joining the abutting parts 301 and 311 together is smaller than the cross section of the connection tube 241 are connected with each other to unify by vibration welding. It should be noted that the shape of the abutting parts 301 and 311 are not limited to a semicircle as shown in FIG. 21 so far as the above conditions are satisfied, and an ellipse, a triangle or other polygons such as a square and the like are also possible. It is recommendable to use a material having rubber hardness of 85 or more, preferably in the range of 85 to 97, more preferably in the range of 90 to 95 as the connection tube 241 to enhance air tightness of a connection between the connecting part 242b of the air bag main body 242 and the connection tube 241.

It is possible to place the cushioning material for adjustment 240 of the present embodiment to respective housing parts 31 and 32 of the bulging member 30 shown in FIG. 2, and to place the cushioning material for 30 adjustment 34 shown in FIG. 2 to respective housing parts 231 and 232 of the bulging member 230 of the present embodiment. It is also possible to use both the cushioning material for adjustment 240 of the present embodiment and the cushioning material for adjustment 34 shown in FIG. 2 together.

In the above-described explanation, the lumbar support 10 or 200 is used in a state that the housing parts 31, 32, or 231, 232 are arranged to vertically align taking their longitudinal direction in the horizontal direction as shown in FIG. 1, FIG. 2 and FIG. 19. With this arrangement, a preferable characteristic as explained in the above-described embodiments is obtained by a two-point support, namely, the pelvis and the lumbar vertebra portion. However, depending on user's preference, it is also possible to use them in an arrangement state of turning 90 degree clockwise or counterclockwise to the state shown in FIG. 2 or the like, that is, in a state that the housing parts 31, 32 or 231, 232 are arranged in such that the longitudinal direction thereof is parallel to the vertical direction so that the housing parts are aligned right and left. Since the bulging member 30 or 230 is unified by the flexible plate 20 or 220, the present invention also has a merit of responding to user's various preferences by adjusting a direction of the flexible plate 20 or 220 voluntarily.

In the explanation described above, the lumbar support is used in incorporation into a back cushion of a cushion for a seat or a seat back of a seat structure. This usage is normal for the lumbar support, but in a bottom cushion of a cushion for a seat or a seat cushion of a seat structure, the above-described lumbar support can also be used as a supplementary cushioning material by installing it under a cushioning material disposed on the surface layer thereof. For instance, a flexible plate side of the lumbar support is bonded to the back of a cushioning material to be a front surface layer, and by disposing it at a little forward of roughly a central portion in the bottom cushion, it is possible to suppress forward displacement of the buttocks and to enhance load support-ability.

What is claimed is:

1. A lumbar support incorporated into a back cushion having a front surface, the lumbar support comprising:
   a flexible plate made of plastic and having a front surface and a back surface; and
   a bulging member provided with two housing parts formed adjacent to each other in the vertical direction of the back cushion, sandwiching a border region and able to house and take out a cushioning material for adjustment in the housing parts,
   wherein said bulging member is supported by bonding the border region on the back surface of said flexible plate, and is incorporated into the back cushion so that the front surface of said flexible plate is positioned on the front surface of the back cushion.

2. The lumbar support according to claim 1, wherein a supporting cloth material is annexed to the back surface of the back cushion, and the lumbar support is disposed between the back cushion and the supporting cloth material.

3. The lumbar support according to claim 1, wherein said flexible plate is provided such that when the bulging member is placed in contact with a flat measurement surface, roughly a flat surface having a width of 40 mm to 60 mm is formed corresponding to the border region of the bulging member.

4. The lumbar support according to claim 1, wherein the width of the border region of said bulging member is in the range of 12 mm to 25 mm.

5. The lumbar support according to claim 1, wherein the sizes of two housing parts comprising said bulging member differ from each other.

6. The lumbar support according to claim 1, wherein the number of cushioning materials for adjustment, which can be inserted into or taken out from each housing part is adjustable.

7. The lumbar support according to claim 1, wherein said flexible plate and said bulging member are connected along a line through approximately the center of the border region parallel to the length of the border region.

8. The lumbar support according to claim 7, wherein said flexible plate and said bulging member are sewn together.

9. The lumbar support according to claim 1, wherein said bulging member is made of a solid knitted fabric, and is formed by welding overlapped border region of respective solid knitted fabrics.

10. The lumbar support according to claim 1, wherein the cushioning material for adjustment is made of a solid knitted fabric.

11. The lumbar support according to claim 10, wherein the periphery of the solid knitted fabric is edge-treated by welding.

12. The lumbar support according to claim 1, wherein the cushioning material for adjustment comprises:
   an air bag main body including a connection tube serving as an opening for air-flow, connected to a pump for filling air, and holding air filled inside via the connection tube to form an air room; and
   a solid knitted fabric disposed in the air bag main body.

13. The lumbar support according to claim 12, wherein said cushioning material for adjustment is used such that a pump is connected to the connection tube.

14. The lumbar support according to claim 1, wherein said flexible plate is provided with a characteristic of a spring constant in the range of 0.3 N/mm to 0.6N/mm obtained from a load-to-deflection characteristic when supported at intervals of 150 mm, and pressed while adjusting the center of a press board having a diameter of 98mm to the center thereof.

15. The lumbar support according to claim 1, wherein said flexible plate has an area larger than a projected area of said bulging member provided with two housing parts.

16. A cushion for a seat, integrally formed of a bottom cushion and a back cushion, and used by being mounted on a seat cushion and a seat back of a seat structure, wherein
   the bottom cushion and back cushion are formed from a solid knitted fabric, and a lumbar support is incorporated into the back cushion, which has a front surface,
   wherein the lumbar support comprises;
   a flexible plate made of plastic and having a front surface and a back surface; and
   a bulging member provided with two housing parts formed adjacent to each other in the vertical direction of the back cushion, sandwiching a border region and able to house and take out a cushioning material for adjustment in the housing parts, in which said bulging member is supported by bonding the border region on the back surface of said flexible plate, and is incorporated into the back cushion so that the front surface of said flexible plate is positioned on the front surface of the back cushion.

17. A seat structure provided with a seat cushion and a seat back, wherein a lumbar support is incorporated into a back cushion disposed on the seat back, the back cushion having a front surface,
wherein the lumber support comprises:
a flexible plate made of plastic and having a front surface and a back surface; and
a bulging member provided with two housing parts formed adjacent to each other in the vertical direction of the back cushion, sandwiching a border region and able to house and take out a cushioning material for adjustment in the housing parts, in which said bulging member is supported by bonding the border region on the back surface of said flexible plate, and is incorporated into the back cushion so that the front surface of said flexible plate is positioned on the front surface of the back cushion.

18. A cushion for a seat integrally formed of a bottom cushion and a back cushion, and used by being mounted on a seat cushion and a seat back in a seat structure, wherein the bottom cushion and back cushion are formed from a solid knitted fabric, and an auxiliary cushioning member is incorporated into the bottom cushion, the back cushion having a front surface,
wherein the auxiliary cushioning member comprises:
a flexible plate made of plastic and having a front surface and a back surface; and
a bulging member provided with two housing parts formed adjacent to each other in the vertical direction of the back cushion, sandwiching a border region and able to house and take out a cushioning material for adjustment in the housing parts, in which said bulging member is supported by bonding the border region on the back surface of said flexible plate, and is incorporated into the bottom cushion so that the front surface of said flexible plate is positioned on the front surface of the bottom cushion.

19. A seat structure provided with a seat cushion and seat back, wherein an auxiliary cushioning member is incorporated into a bottom cushion disposed on said seat cushion, the bottom cushion having a front surface,
wherein the auxiliary cushioning member comprises:
a flexible plate made of plastic and having a front surface and a back surface; and
a bulging member provided with two housing parts formed adjacent to each other in the vertical direction of the back cushion, sandwiching a border region and able to house and take out a cushioning material for adjustment in the housing parts, in which said bulging member is supported by bonding the border region on the back surface of said flexible plate, and is incorporated into the bottom cushion so that the front surface of said flexible plate is positioned on the front surface of the bottom cushion.

* * * * *